US011245876B2

(12) United States Patent
Siminoff et al.

(10) Patent No.: US 11,245,876 B2
(45) Date of Patent: *Feb. 8, 2022

(54) AUDIO/VIDEO RECORDING AND COMMUNICATION DEVICES

(71) Applicant: AMAZON TECHNOLOGIES, INC., Seattle, WA (US)

(72) Inventors: Mark Siminoff, Mountain View, CA (US); Spiro Sacre, Los Angeles, CA (US); James Siminoff, Pacific Palisades, CA (US); John Modestine, Los Angeles, CA (US); Elliott Lemberger, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,987

(22) Filed: Oct. 10, 2019

(65) Prior Publication Data

US 2020/0045269 A1 Feb. 6, 2020

Related U.S. Application Data

(63) Continuation of application No. 15/906,334, filed on Feb. 27, 2018, now Pat. No. 10,506,205.

(30) Foreign Application Priority Data

Mar. 31, 2017 (CN) .......................... 201720330704.4

(51) Int. Cl.
*H04N 7/18* (2006.01)
*H04N 5/225* (2006.01)
(Continued)

(52) U.S. Cl.
CPC .......... *H04N 7/186* (2013.01); *H02J 7/0042* (2013.01); *H04N 5/2252* (2013.01); *H04N 7/188* (2013.01);
(Continued)

(58) Field of Classification Search
CPC ..... H02J 7/0042; H04N 5/2252; H04N 7/186; H04N 7/188; H04R 1/02; H04R 1/023;
(Continued)

(56) References Cited

U.S. PATENT DOCUMENTS

| 4,764,953 A | 8/1988 | Chern et al. |
| 5,428,388 A | 6/1995 | Von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

International Search Report and Written Opinion of PCT/US2018/019888 dated Jun. 11, 2018, 19 pp.

(Continued)

*Primary Examiner* — Jessica M Prince
(74) *Attorney, Agent, or Firm* — Lathrop GPM LLP

(57) ABSTRACT

An audio/video recording and communication device configured as a doorbell has a housing with a support structure and a removable faceplate. A flexible translucent membrane of the faceplate supports a button aligned with a mechanical switch when the removable faceplate is attached to the housing such that a plurality of light emitting elements are positioned around the mechanical switch transmit light through the translucent membrane. A removable battery casing is configured to hold at least one battery and has a release button physically coupling with a detent of the (Continued)

support structure to retain the removable battery casing within the support structure. The removable battery casing may be removed from the device for recharging without removing the device from a surface on which it is mounted.

19 Claims, 23 Drawing Sheets

Related U.S. Application Data

(60) Provisional application No. 62/464,301, filed on Feb. 27, 2017.

(51) Int. Cl.
*H02J 7/00* (2006.01)
*H04R 1/02* (2006.01)
*H04R 3/00* (2006.01)
*H04R 27/00* (2006.01)

(52) U.S. Cl.
CPC ............ *H04R 1/02* (2013.01); *H04R 1/028* (2013.01); *H04R 1/023* (2013.01); *H04R 3/00* (2013.01); *H04R 27/00* (2013.01); *H04R 2227/003* (2013.01); *H04R 2400/00* (2013.01); *H04R 2410/00* (2013.01)

(58) Field of Classification Search
CPC .............. H04R 1/028; H04R 2227/003; H04R 2400/00; H04R 2410/00; H04R 27/00; H04R 3/00
See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,351,215 B1* | 4/2008 | Roberts .................. A45D 33/24 132/294 | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2003/0221295 A1 | 12/2003 | Berger | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2004/0241539 A1 | 12/2004 | Katayama | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008801 A1 | 1/2007 | Tylicki et al. | |
| 2007/0048599 A1 | 3/2007 | Choi | |
| 2010/0225455 A1 | 9/2010 | Claiborne et al. | |
| 2011/0109790 A1 | 5/2011 | Shinohara et al. | |
| 2013/0057695 A1 | 3/2013 | Huisking | |
| 2014/0267716 A1 | 9/2014 | Child et al. | |
| 2015/0022620 A1* | 1/2015 | Siminoff ................ H04N 7/186 348/14.02 |
| 2015/0035987 A1 | 2/2015 | Fernandez | |
| 2015/0163463 A1 | 6/2015 | Hwang et al. | |
| 2016/0005307 A1 | 1/2016 | Deiiuliis et al. | |
| 2016/0300476 A1* | 10/2016 | Kasmir .................... G08B 3/10 |
| 2016/0307380 A1 | 10/2016 | Ho et al. | |
| 2016/0330403 A1 | 11/2016 | Siminoff | |
| 2016/0364009 A1 | 12/2016 | Lemberger | |
| 2017/0026555 A1* | 1/2017 | Hoyda .................... G03B 17/14 |
| 2017/0027292 A1* | 2/2017 | Hibino .................... A45C 11/00 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |

(56) References Cited

FOREIGN PATENT DOCUMENTS

| | | |
|---|---|---|
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

OTHER PUBLICATIONS

U.S. Appl. No. 15/906,334 Notice of Allowance dated Aug. 5, 2019, 15 pages.
U.S. Appl. No. 15/906,334 Office Action dated Mar. 25, 2019, 15 pages.
U.S. Appl. No. 15/906,334 Office Action dated Dec. 12, 2018, 16 pages.
U.S. Appl. No. 15/906,334 Office Action dated May 14, 2018, 19 pages.

\* cited by examiner

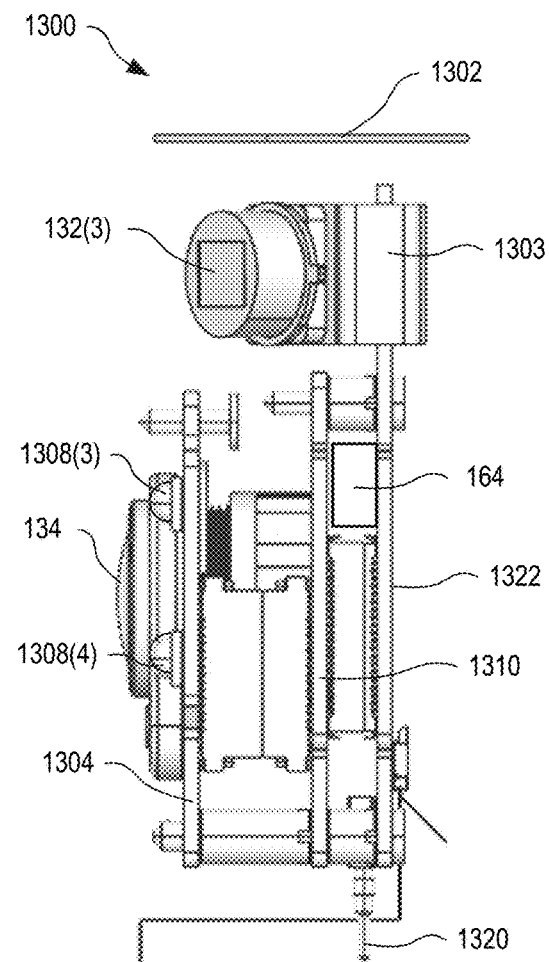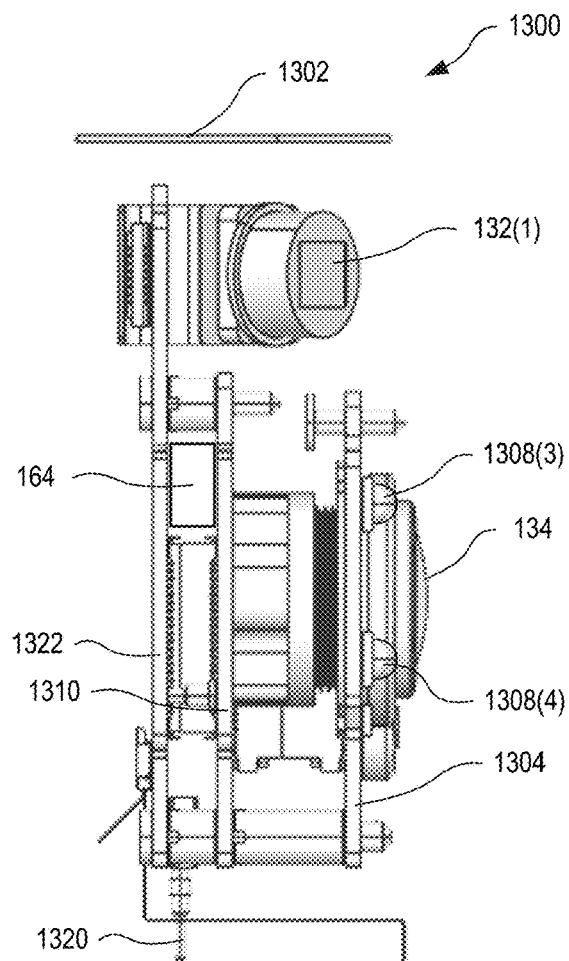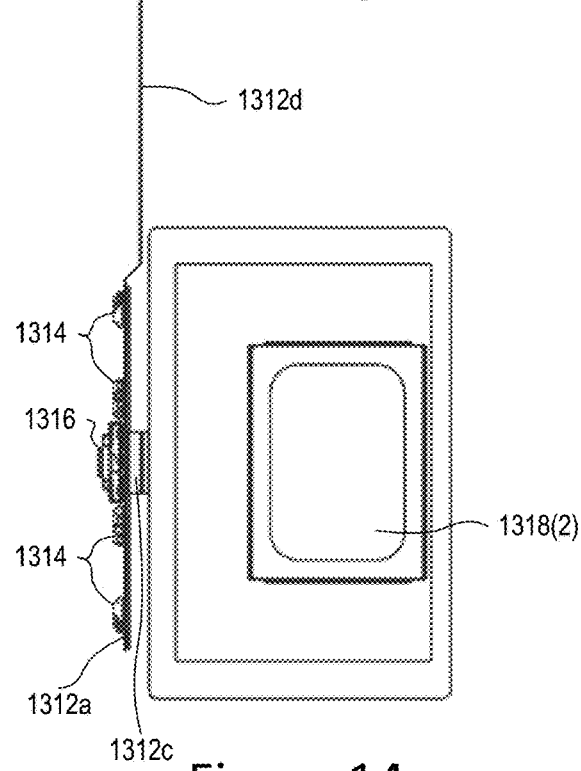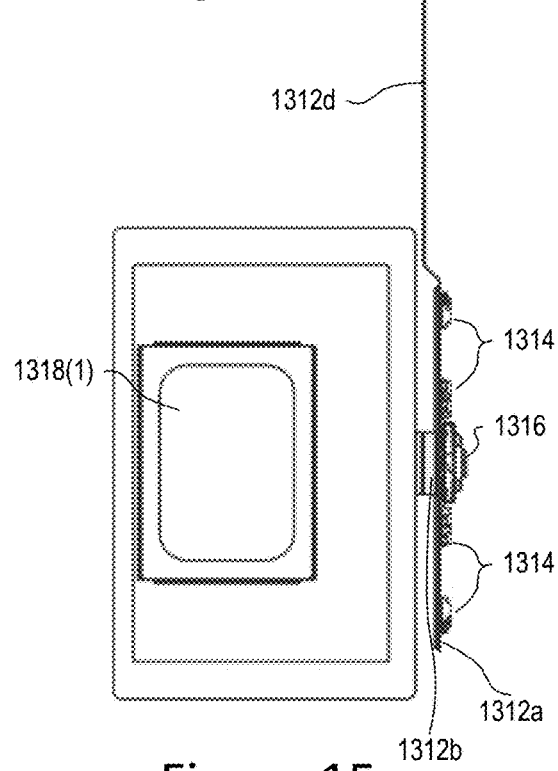
Figure 14        Figure 15

AUDIO/VIDEO RECORDING AND COMMUNICATION DEVICES

RELATED APPLICATIONS

This application is a continuation of U.S. patent application Ser. No. 15/906,334, filed Feb. 27, 2018 which benefits from and claims priority to U.S. Provisional Patent Application No. 62/464,301, filed Feb. 27, 2017, and Chinese Application No. 201720330704.4, filed Mar. 31, 2017, the disclosures of which are incorporated herein by reference in their entirety.

TECHNICAL FIELD

The present embodiments relate to audio/video recording and communication devices, including audio/video (A/V) recording and communication doorbell systems. In particular, the present embodiments relate to improvements in the functionality of audio/video recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/video recording and communication devices, such as doorbells, provide this functionality, and can also aid in crime detection and prevention. Audio and/or video captured by an audio/video recording and communication device can be uploaded to the cloud and recorded on a remote server. Subsequent review of the audio/video footage can aid law enforcement in capturing perpetrators of home burglaries and other crimes. The presence of one or more audio/video recording and communication devices on the exterior of a home, such as a doorbell unit at the entrance to the home, acts as a deterrent against would-be burglars.

SUMMARY

In a first aspect, an audio/video recording and communication device includes a housing with a support structure, a processor within the housing, an image sensor, at least one speaker, a mechanical switch, and a removable battery. The image sensor is communicatively coupled with the processor and positioned, by the support structure, behind an optically transparent front portion of the housing that allows light to pass therethrough and impinge on the image sensor to capture images of an object. The at least one speaker is positioned by the support structure to align with a speaker grill of the housing to emit audible sound. The mechanical switch is coupled with the support structure and responsive to touch to activate a doorbell.

In embodiments of the first aspect, the device further includes a removable battery casing configured to hold the removable battery and having a release button configured to physically couple with a detent of the support structure to retain the removable battery casing within the support structure.

In embodiments of the first aspect, the housing further includes a removable faceplate.

In embodiments of the first aspect, the removable faceplate includes a speaker grill aligned with the at least one speaker when the removable faceplate is coupled with the audio/video recording and communication device.

In embodiments of the first aspect, the release button is positioned behind the removable faceplate when both the removable battery casing and the removable faceplate are coupled with the audio/video recording and communication device.

In embodiments of the first aspect, the device further includes a flexible translucent membrane and a plurality of light emitting elements. The flexible translucent membrane is secured within an aperture of the removable faceplate and supports a button aligned with the mechanical switch when the removable faceplate is attached to the audio/video recording and communication device. The plurality of light emitting elements are positioned around the mechanical switch and operable to transmit light through the flexible translucent membrane.

In embodiments of the first aspect, the flexible translucent membrane is deformable upon depression of the button to actuate the mechanical switch.

In embodiments of the first aspect, the device further includes a flex circuit electrically coupling the processor to (a) the mechanical switch, (b) the speaker, and (c) the plurality of light emitting elements.

In embodiments of the first aspect, the release button includes a leaf spring to maintain engagement of the release button with the detent.

In embodiments of the first aspect, the speaker grill includes two speaker grills on opposing sides of the housing, the at least one speaker includes two speakers each respectively aligning with one of the two speaker grills.

In embodiments of the first aspect, the device further includes a motion sensor communicatively coupled with the processor and configured to sense motion of an object in front of the audio/video recording and communication device.

In embodiments of the first aspect, the processor is configured to sense motion in images, captured by the image sensor, of an object in front of the audio/video recording and communication device.

In embodiments of the first aspect, the device further includes a flexible translucent membrane and a plurality of light emitting elements. The flexible translucent membrane supports a button aligned with the mechanical switch and the plurality of light emitting elements are positioned around the mechanical switch and operable to transmit light through the flexible translucent membrane.

In embodiments of the first aspect, the flexible translucent membrane is deformable upon depression of the button to actuate the mechanical switch.

In embodiments of the first aspect, the device further includes a flex circuit electrically coupling the processor to (a) the mechanical switch, (b) the speaker, and (c) the plurality of light emitting elements.

In embodiments of the first aspect, the device further includes a flex circuit electrically coupling the processor to (a) the mechanical switch and (b) the speaker.

In embodiments of the first aspect, the flex circuit and support structure create a cavity for the removable battery.

In embodiments of the first aspect, the flex circuit and support structure create a cavity for the removable battery casing.

In embodiments of the first aspect, the flex circuit passes through at least three apertures of the support structure such that the mechanical switch is positioned on the outside of the support structure and the speaker is positioned on the inside of the support structure.

In embodiments of the first aspect, the device further includes a plurality of infrared light emitting elements internal to the housing and operable by the processor to transmit infrared light through an infrared transmitting portion of the housing and illuminate the object.

In embodiments of the first aspect, the device further includes a flexible switch cover coupled with the support structure and covering the mechanical switch.

In embodiments of the first aspect, the device further includes a communication module that is configured to communicate with a remote server.

In embodiments of the first aspect, the removable battery includes a casing having a socket for coupling with a power source to charge the removable battery.

In embodiments of the first aspect, the device further includes screw terminals for connecting to wires of an external power source.

In embodiments of the first aspect, the external power source includes a doorbell.

In a second aspect, an audio/video recording and communication device includes a housing with a support structure, a processor within the housing, an image sensor communicatively coupled with the processor, at least one speaker positioned by the support structure to align with a speaker grill of the housing to emit audible sound, a mechanical switch, a flexible translucent membrane supporting a button aligned with the mechanical switch, and a plurality of light emitting elements. The image sensor is positioned, by the support structure, behind an optically transparent front portion of the housing that allows light to pass therethrough and impinge on the image sensor to capture images of an object. The mechanical switch is coupled with the support structure and responsive to touch to activate a doorbell, and the plurality of light emitting elements are positioned around the mechanical switch and operable to transmit light through the flexible translucent membrane.

In embodiments of the second aspect, the device further includes a flex circuit electrically coupling the processor to (a) the mechanical switch, (b) the speaker, and (c) the plurality of light emitting elements.

In embodiments of the second aspect, the flexible translucent membrane (1) is secured within an aperture of a removable faceplate of the housing, and (2) supports a button aligned with the mechanical switch when the removable faceplate is attached to the audio/video recording and communication device.

In a third aspect, an audio/video recording and communication device includes a housing with a support structure and a removable faceplate, a processor within the housing, an image sensor communicatively coupled with the processor, at least one speaker, and a mechanical switch. The image sensor is positioned, by the support structure, behind an optically transparent front portion of the housing that allows light to pass therethrough and impinge on the image sensor to capture images of an object. The at least one speaker is positioned by the support structure to align with a speaker grill of the housing to emit audible sound. The mechanical switch is coupled with the support structure and responsive to touch to activate a doorbell.

In embodiments of the third aspect, the device further includes a flexible translucent membrane and a plurality of light emitting elements. The flexible translucent membrane is secured within the removable faceplate and supports a button aligned with the mechanical switch. The plurality of light emitting elements are positioned around the mechanical switch and operable to transmit light through the flexible translucent membrane.

In embodiments of the third aspect, the device further includes a flex circuit electrically coupling the processor to (a) the mechanical switch, (b) the speaker, and (c) the plurality of light emitting elements.

In a fourth aspect, an audio/video recording and communication device includes a housing with support structure and removable faceplate. A processor is within the housing. A motion sensor is communicatively coupled with the processor and configured to sense motion of an object in front of the wireless audio/video recording and communication device. An image sensor is communicatively coupled with the processor and positioned, by the support structure, behind an optically transparent front portion of the housing that allows light to pass therethrough and impinge upon the image sensor, to capture images of the object. At least one speaker is positioned by the support structure to align with a speaker grille of the removable faceplate, to emit audible sound. A mechanical switch couples with the support structure and is responsive to touch to activate a doorbell. A flexible translucent membrane is secured within an aperture in the removable faceplate and supports a button aligned with the mechanical switch when the removable faceplate is attached to the housing. A flex circuit electrically couples the processor to (a) the mechanical switch and (b) the speaker. A plurality of light emitting elements are positioned around the mechanical switch and are connected by the flex circuit to the processor. The light emitting elements are operable by the processor to transmit light through the translucent membrane. A plurality of infrared light emitting elements are internal to the housing and operable by the processor to transmit infrared light through an infrared transmitting portion of the housing and illuminate the object. A removable battery casing is configured to hold at least one battery and has a release button that physically couples with a detent of the support structure to retain the removable battery casing within the support structure.

In embodiments of the fourth aspect, the release button is hidden behind the removable faceplate when both the removable battery casing and the removable faceplate are attached to the housing.

In embodiments of the fourth aspect, the release button includes a leaf spring to maintain engagement of the release button with the detent.

In embodiments of the fourth aspect, the flexible translucent membrane is deformable upon depression of the button to actuate the mechanical switch.

In embodiments of the fourth aspect, the flex circuit and support structure create a cavity for the removable battery.

Embodiments of the fourth aspect further comprise a second speaker positioned by the support structure to align with a second speaker grille of the removable faceplate.

Embodiments of the fourth aspect further comprise a flexible switch cover coupled with the support structure and covering the mechanical switch.

Embodiments of the fourth aspect further comprise a communication module that is configured to communicate with a remote server.

In embodiments of the fourth aspect, the communication module is configured to communicate wirelessly with a communication network.

In a fifth aspect, an audio/video recording and communication device includes a housing with support structure and removable faceplate. A processor is positioned within the housing and a motion sensor communicatively couples with the processor to sense movement of an object in front of the wireless audio/video recording and communication device. An image sensor communicatively coupled with the processor is positioned, by the support structure, behind an optically transparent front portion of the housing to capture transmitted electro-magnetic energy from the object. At least one speaker, positioned by the support structure, aligns with a speaker grille of the removable faceplate to emit sound. A mechanical switch positioned at a front of the support structure is responsive to manual input by the object. A plurality of light emitting elements positioned around the mechanical switch transmits visible light through a translucent membrane. A flex circuit electrically couples the processor to (a) the mechanical switch, (b) the speaker, and (c) the plurality of light emitting elements. A plurality of infrared light emitting elements, positioned with the housing, emit infrared radiation through an infrared transmitting portion of the faceplate to illuminate the object. The flex circuit passes through at least three apertures of the support structure such that the mechanical switch is positioned on the outside of the support structure and the speaker is positioned on the inside of the support structure.

In embodiments of the fifth aspect, the flexible translucent membrane is secured within an aperture in the removable faceplate to support a button aligned with the mechanical switch when the removable faceplate is attached to the housing.

Embodiments of the fifth aspect further comprise a flexible switch cover coupled with the support structure and aligned with the button of the removable faceplate such that when the removable faceplate is attached to the support structure, the button interacts with the switch cover to depress the mechanical switch when pressure is applied to the button.

In a sixth aspect, an audio/video recording and communication device includes a housing that has a support structure and a removable faceplate. A processor is within the housing. A motion sensor is positioned by a first portion of the support structure and is coupled with the processor to sense motion of an object in front of the wireless audio/video recording and communication device. An image sensor is positioned by a second portion of the support structure and is coupled with the processor to capture images of the object when sensed by the motion sensor. At least one speaker is positioned by a respective third portion of the support structure and is coupled with the processor to emit an audible sound. The third portion is positioned such that the speaker is aligned with a speaker grille of the removable faceplate. A mechanical switch is supported by a front surface of the support structure and is responsive to touch to activate a doorbell. The front surface, third portion, and second portion form a cavity within the housing and a flex circuit is formed around the cavity to electrically couple the mechanical switch and speaker to the processor. A removable battery casing is configured to hold at least one battery and has a release button physically coupling with the support structure to retain the removable battery casing within the cavity.

Embodiments of the sixth aspect further comprise a flexible translucent membrane secured within an aperture in the removable faceplate to movably support a button aligned with the mechanical switch when the removable faceplate is attached to the housing.

Embodiments of the sixth aspect further comprise a plurality of light emitting elements positioned around the mechanical switch to emit light through the flexible translucent membrane, the flex circuit electrically coupling the light emitting elements to the processor.

In a seventh aspect, a doorbell has a manually operated switch mounted to a faceplate of a housing that contains a battery electrically coupled with a power printed circuit board, a camera supported by a camera printed circuit board, and a communication module. The housing is mountable to a flat surface. An improvement includes a removable battery casing containing the battery within the housing and removable from the housing without removing the housing from the flat surface. The removable battery casing having a release button including a leaf spring and a protrusion that engages with a detent of the housing to retain the removable battery casing within the housing.

Embodiments of the seventh aspect further comprise a removable faceplate forming a front part of the housing and having at least two detents that align with corresponding protrusions of a back part of the housing to retain the faceplate in position, the removable faceplate being removable to access the release button and the removable battery casing.

Embodiments of the seventh aspect further comprise at least two speakers positioned apart and each aligned with a different speaker grille formed by the removable faceplate.

Embodiments of the seventh aspect further comprise a flex circuit electrically connecting the power printed circuit board to (a) the manually operated switch, and (b) each of the at least two speakers.

In an eighth aspect, a doorbell has a battery, a mechanically operated switch, and a wireless transmitter. An improvement includes a button positioned adjacent to, and aligned with, the mechanically operated switch by a flexible translucent membrane secured within an aperture of a faceplate of the doorbell such that the button may be manually pressed to actuate the mechanical switch.

Embodiments of the eighth aspect further comprise a plurality of light emitting elements positioned around the mechanical switch to emit light through the flexible translucent membrane.

Embodiments of the eighth aspect further comprise a removable battery casing containing the battery within a housing of the doorbell such that the removable battery casing and the battery may be removed from the housing without removing the doorbell from a flat surface to which it is mounted. The removable battery casing has a release button formed of a leaf spring and a protrusion engaging a detent of the housing to retain the removable battery casing within the housing.

In embodiments of the eighth aspect, the release button is accessible when the faceplate is removed from the doorbell. The faceplate has a plurality of detents that engage protrusions of the housing to retain the faceplate.

In a ninth aspect, a doorbell has a manually operated switch, a faceplate, a battery electrically coupled with a power printed circuit board, a camera supported by a camera printed circuit board, a communication module, at least one speaker, and a housing, mountable to a flat surface, containing the battery, the power printed circuit board, the camera printed circuit board, and the communication module. An improvement includes a flex circuit electrically coupling the manually operated switch to the power printed circuit board and coupling the speaker to the power printed circuit board.

Advantageously, the flexible translucent membrane supports the button, allows the button to move to actuate the mechanical switch, and allows the light emitting elements to emit light proximate the button. By allowing the light to be emitted proximate the button, the flexible translucent membrane advantageously allows the audio/video recording and communication device to attract attention to the button when motion is detected. The flexible translucent membrane further prevents ingress of moisture around the button. Advantageously, the light emitting elements may emit light proximate the button to indicate a configuration status of the audio/video recording and communication device.

Advantageously, the faceplate may be removed from the audio/video recording and communication device without removing the audio/video recording and communication device from a supporting structure, such as an intermediate mounting support between the building, or such as the building itself. Further, after removing the faceplate, the removable battery casing may be removed from the audio/video recording and communication device without removing the audio/video recording and communication device from the supporting structure. This allows the batteries within the removable battery casing to be easily removed from the audio/video recording and communication device and recharged or replaced. Advantageously, the faceplate prevents removal of the removable battery casing when in place.

Advantageously, the faceplate prevents access to the reset button until the faceplate is removed from the audio/video recording and communication device.

Advantageously, the flex circuit and the support structure cooperate to form the cavity for the removable battery casing while providing electrical connectivity between the processor and each of the mechanical switch, the speaker, and plurality of light emitting elements.

Advantageously, the flexible switch cover protects the mechanical switch and the plurality of light emitting elements when the faceplate is removed from the audio/video recording and communication device.

BRIEF DESCRIPTION OF THE FIGURES

The various embodiments of an audio/video recording and communication device now will be discussed in detail with an emphasis on highlighting the advantageous features. These drawings include the following figures, in which like numerals indicate like parts:

FIGS. 13-16, respectively, show front, right-side, left-side, and back views of electronic components of the audio/video recording and communication device of FIGS. 3-6;

DETAILED DESCRIPTION OF THE EMBODIMENTS

Figure 1:
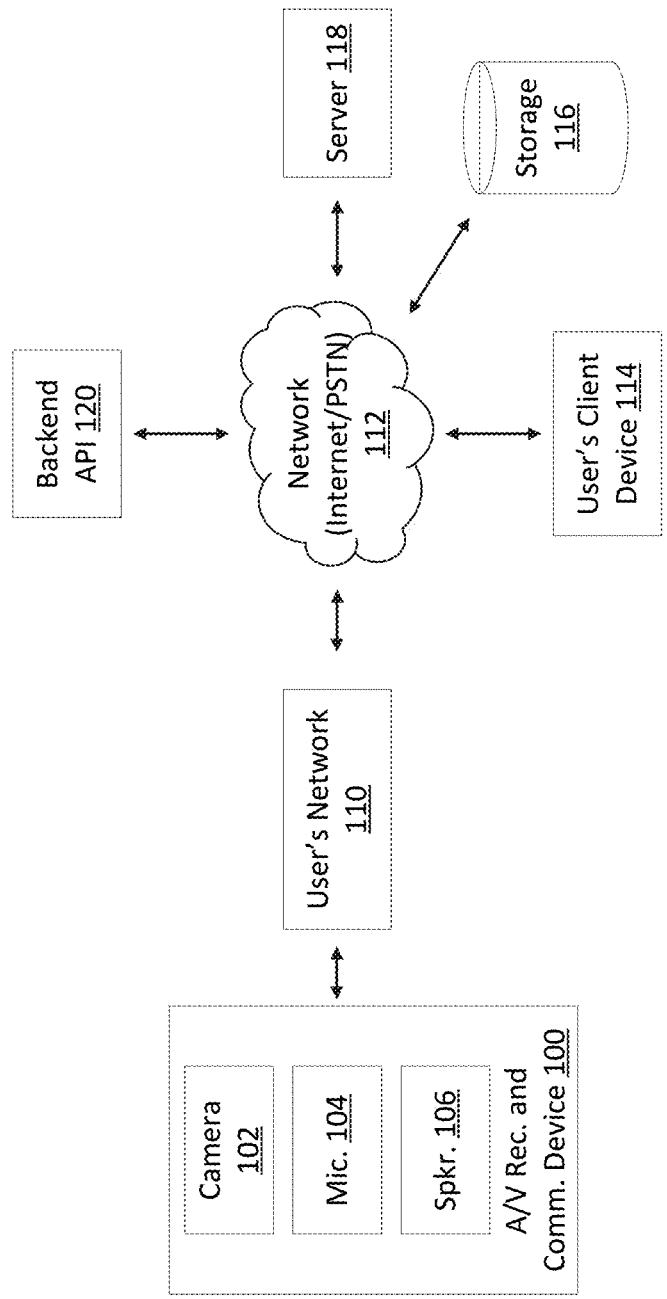
FIG. 1 is a functional block diagram illustrating a system for streaming and storing audio/video content captured by an audio/video recording and communication device, in an embodiment.

The following detailed description describes the present embodiments with reference to the drawings. In the drawings, reference numbers label elements of the present embodiments. These reference numbers are reproduced below in connection with the discussion of the corresponding drawing features.

The present embodiments are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video recording and communication device 100. While the present disclosure provides numerous examples of methods and systems including audio/video recording and communication doorbells, the present embodiments are equally applicable for audio/video recording and communication devices other than doorbells. For example, the present embodiments may include one or more audio/video recording and communication security cameras instead of, or in addition to, one or more audio/video recording and communication doorbells. An example audio/video recording and communication security camera may include substantially all of the structure and/or functionality of the doorbells described herein, but without a front button and related components.

The audio/video recording and communication device 100 may be located near the entrance to a structure (not shown), such as a dwelling, a business, a storage facility, etc. The audio/video recording and communication device 100 includes a camera 102, a microphone 104, and a speaker 106. The camera 102 may include, for example, a high definition (HD) video camera, such as one configured for capturing video images at an image display resolution of 720p, or 1080p, or better. While not shown, the audio/video recording and communication device 100 may also include other hardware and/or components, such as a housing, a communication module (which may facilitate wired and/or wireless communication with other devices), one or more motion sensors (and/or other types of sensors), a button, etc. The audio/video recording and communication device 100 may further include similar componentry and/or functionality as the wireless communication doorbells described in U.S. Pat. No. 9,584,775 and US Patent Publication Number 2015/0022618 (application Ser. No. 14/334,922), both of which are incorporated herein in their entireties.

With further reference to FIG. 1, the audio/video recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the audio/video recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components configured for displaying streaming and/or recorded video images. The user's client device 114 may also comprise a speaker and related components configured for broadcasting streaming and/or recorded audio, and may also comprise a microphone. The audio/video recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN, the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network 112 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

In certain embodiments, when a person (may be referred to interchangeably as "visitor") arrives at the audio/video recording and communication device 100, the audio/video recording and communication device 100 detects the visitor's presence and begins capturing video images within a field of view of camera 102. The audio/video recording and communication device 100 may also capture audio through microphone 104. The audio/video recording and communication device 100 may detect the visitor's presence by detecting motion using the camera 102 and/or a motion sensor, and/or by detecting that the visitor has pressed a front button of the audio/video recording and communication device 100 (for example, when the audio/video recording and communication device 100 is a doorbell).

In response to the detection of the visitor, the audio/video recording and communication device 100 sends an alert to the user's client device 114 (FIG. 1) via the user's network 110 and the network 112. The audio/video recording and communication device 100 also sends streaming video, and may also send streaming audio, to the user's client device 114. If the user answers the alert, two-way audio communication may then occur between the visitor and the user through the audio/video recording and communication device 100 and the user's client device 114. The user may view the visitor throughout the duration of the call, but the visitor cannot see the user (unless the audio/video recording and communication device 100 includes a display, which it may in certain embodiments).

The video images captured by the camera 102 of the audio/video recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to the user's client device 114.

With further reference to FIG. 1, the system may further include a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
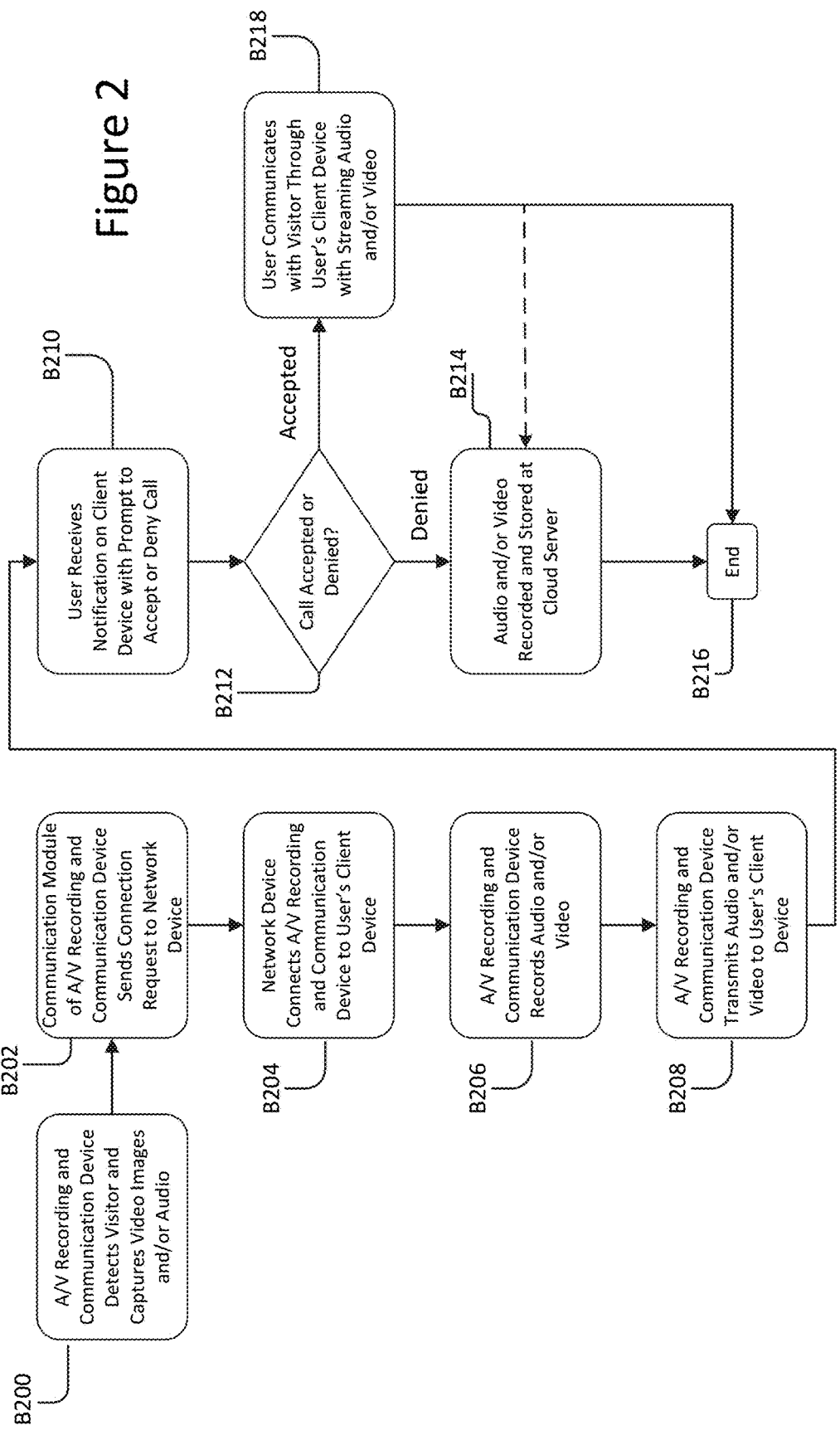
FIG. 2 is a flowchart illustrating a process for streaming and storing audio/video content from an audio/video recording and communication device, in an embodiment.

FIG. 2 is a flowchart illustrating a process 200 for streaming and storing audio/video content from the audio/video recording and communication device 100, in an embodiment. At block B200, the audio/video recording and communication device 100 detects the visitor's presence and captures video images within a field of view of the camera 102. The audio/video recording and communication device 100 may also capture audio through the microphone 104. As described above, the audio/video recording and communication device 100 may detect the visitor's presence by detecting motion using the camera 102 and/or a motion sensor, and/or by detecting that the visitor has pressed a front button of the audio/video recording and communication device 100 (for example, when the audio/video recording and communication device 100 is a doorbell). Also as described above, the video recording/capture may begin when the visitor is detected, or may begin earlier, as described below.

At block B202, a communication module of the audio/video recording and communication device 100 sends a connection request, via the user's network 110 and the network 112, to a device in the network 112. For example, the network device to which the request is sent may be a server such as the server 118. The server 118 may include a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the audio/video recording and communication device 100 to the user's client device 114 through the user's network 110 and the network 112. At block B206, the audio/video recording and communication device 100 may record available audio and/or video data using the camera 102, the microphone 104, and/or any other device/sensor available. At block B208, the audio and/or video data is transmitted (streamed) from the audio/video recording and communication device 100 to the user's client device 114 via the user's network 110 and the network 112. At block B210, the user may receive a notification on the user's client device 114 with a prompt to either accept or deny the call.

At block B212, the process 200 determines whether the user has accepted or denied the call. If the user denies the notification, then the process 200 advances to block B214, where the audio and/or video data is recorded and stored at a cloud server. The session then ends at block B216 and the connection between the audio/video recording and communication device 100 and the user's client device 114 is terminated. If, however, the user accepts the notification, the process 200 proceeds with block B218 where the user communicates with the visitor through the user's client device 114 while audio and/or video data captured by the camera 102, the microphone 104, and/or other devices/sensors, is streamed to the user's client device 114. At the end of the call, the user may terminate the connection between the user's client device 114 and the audio/video recording and communication device 100 and the session ends at block B216. In some embodiments, the audio and/or video data may be recorded and stored at a cloud server (block B214) even if the user accepts the notification and communicates with the visitor through the user's client device 114.

Doorbell Embodiment

Figure 3:
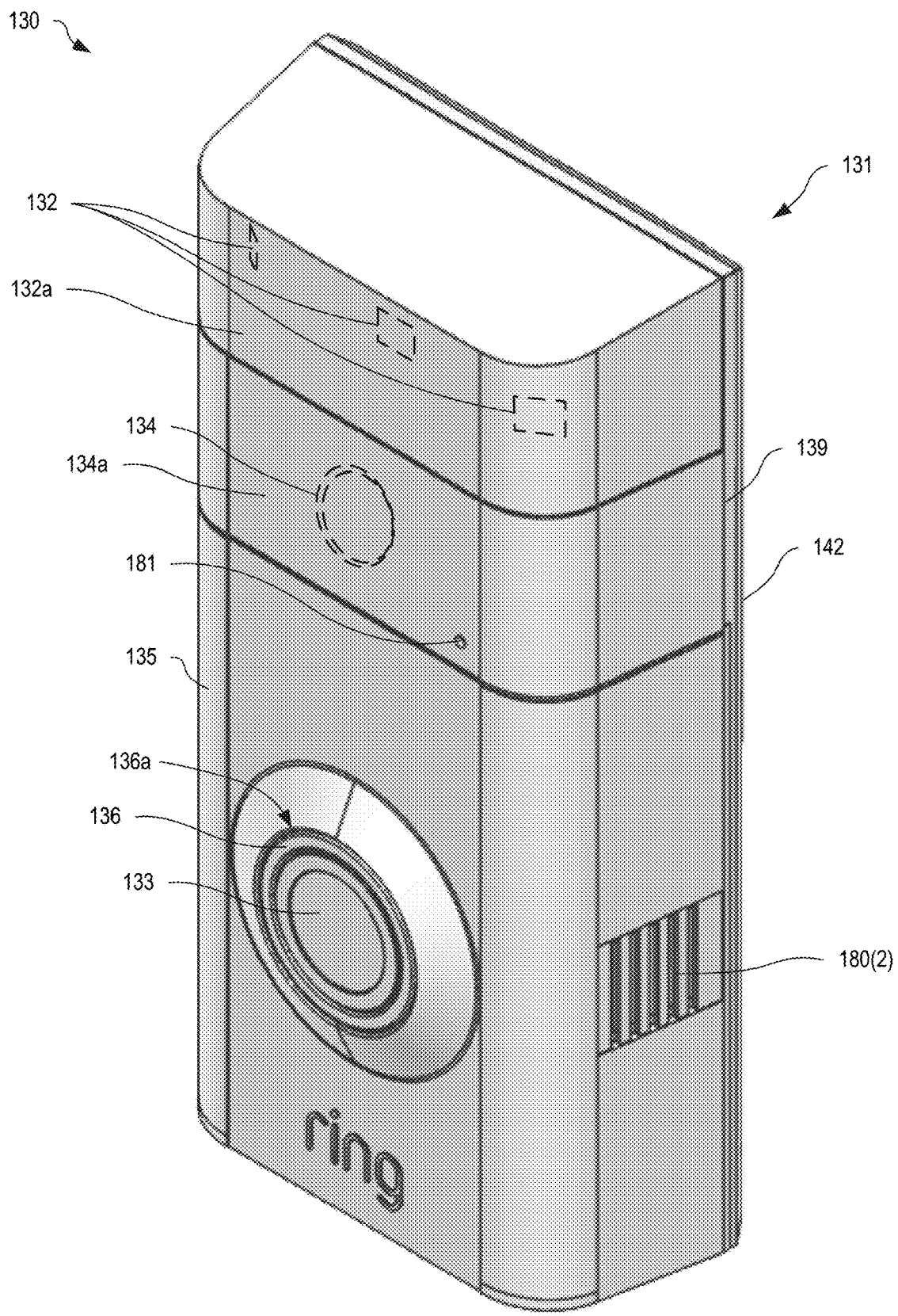
FIG. 3 is a front perspective view of an audio/video recording and communication device implemented as a doorbell, in an embodiment.
Figure 4:
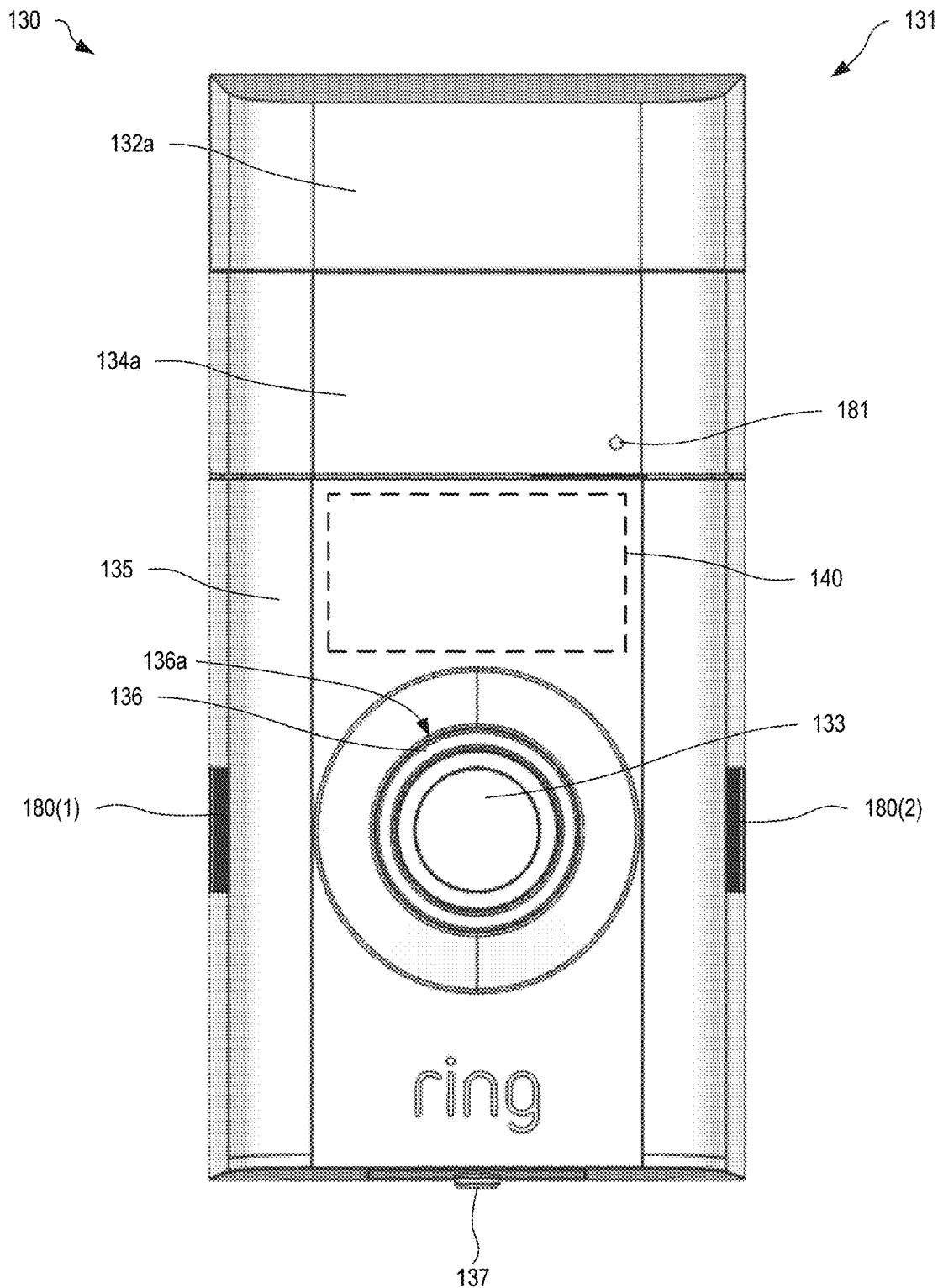
FIG. 4 is a front view of the audio/video recording and communication device of FIG. 3.
Figure 5:
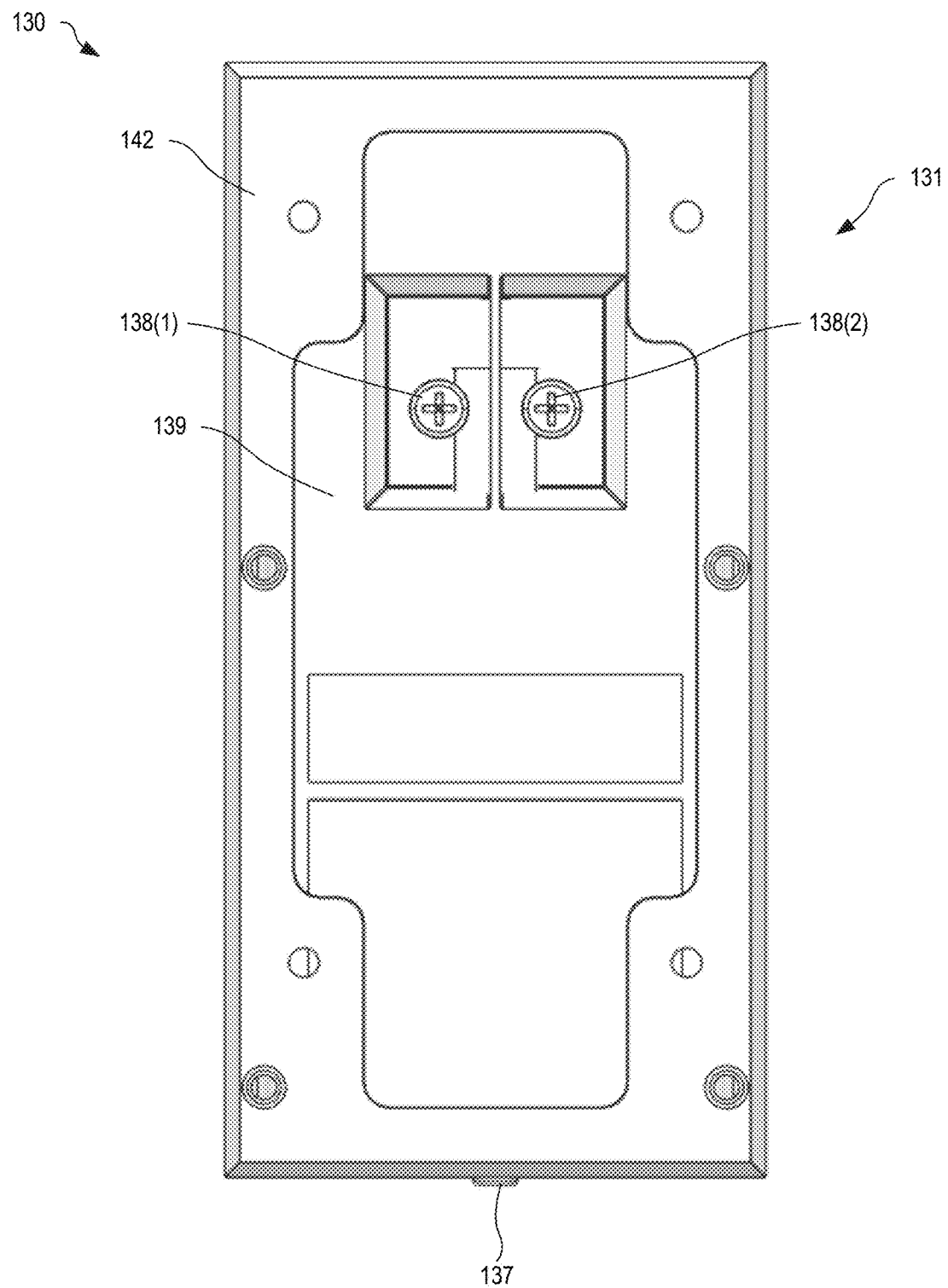
FIG. 5 is a back view of the audio/video recording and communication device of FIGS. 3 and 4.
Figure 6:
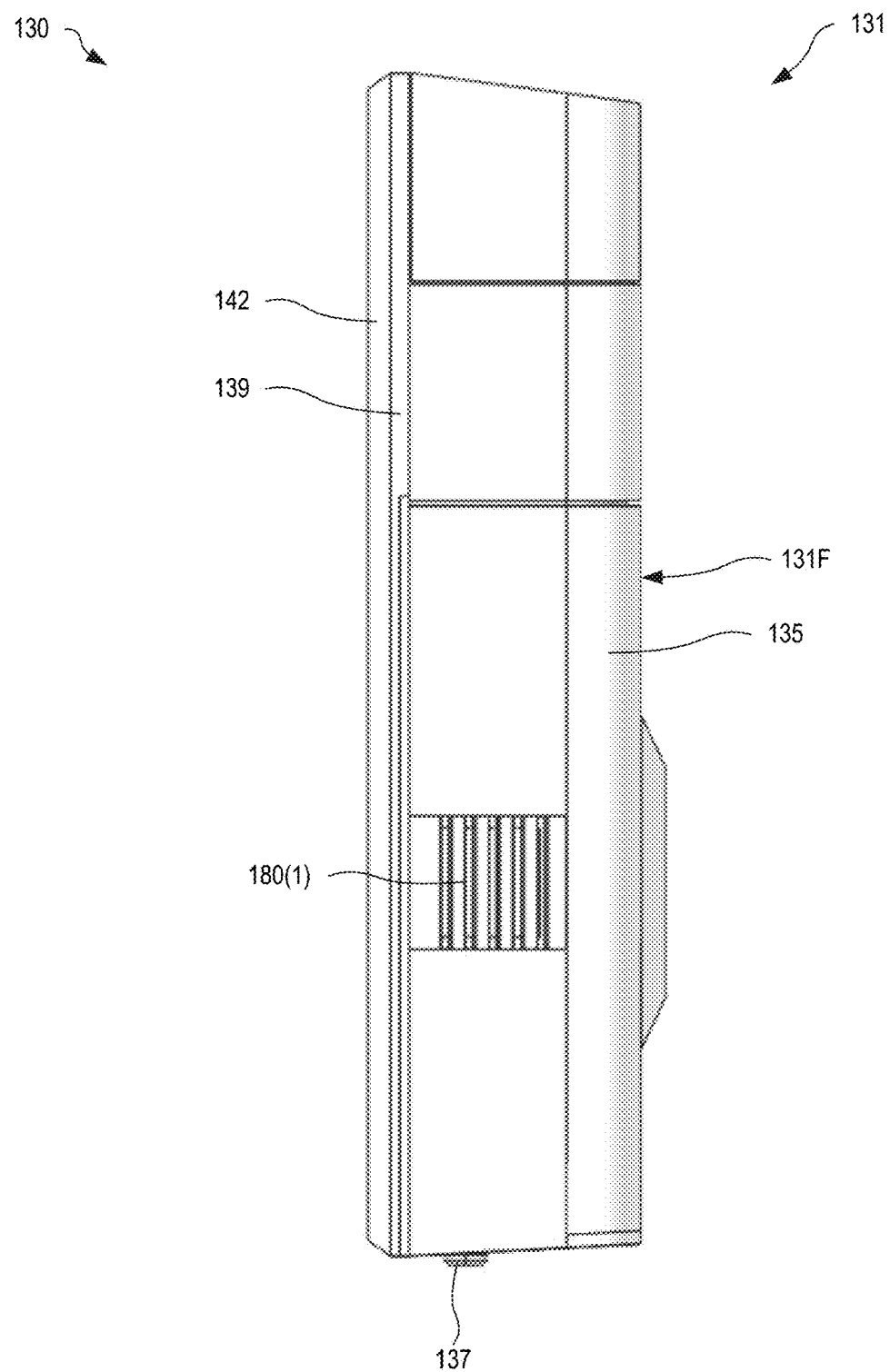
FIG. 6 is a left-side view of the audio/video recording and communication device of FIGS. 3, 4, and 5.

FIGS. 3-6 show an audio/video recording and communication device 130 configured as a doorbell, in embodiments. FIG. 3 is a front perspective view, FIG. 4 is a front view, FIG. 5 is a back view, and FIG. 6 is a left-side view of the device 130. FIGS. 3-6 are best viewed together with the following description.

The device 130 may include some or all of the functionality of the audio/video recording and communication device 100 of FIG. 1 and the process 200 of FIG. 2. The device 130 has a housing 131 that includes a backplate 139, a faceplate 135 with a button 133, an optically-transparent lens 134a positioned in front of a camera 134, and an infrared-transparent lens 132a positioned in front of at least one motion sensor 132. The housing 131 may be further configured with an aperture 181 to allow sound to enter the housing 131 for detection by a microphone (described below). The device 130 may also include a mounting bracket 142 that couples with the backplate 139 to facilitate mounting of the device 130 on a flat surface, such as the exterior of a building, such as a home or office. For example, the mounting bracket 142 may be selected for mounting to surfaces of various composition, including, without limitation, wood, concrete, stucco, brick, vinyl siding, aluminum siding, etc., with any suitable fasteners, such as screws, or interference connections, adhesives, etc. The device 130 may couple to the mounting bracket 142 using any suitable fasteners, such as screws, or interference connections, mating hooks and apertures, adhesives, etc. The backplate 139 may include screw terminals 138 configured to receive electrical wires adjacent a mounting surface of the device 130. The device 130 may receive electrical power through the screw terminals 138 and/or the device 130 may control electrical connectivity of the screw terminals 138 to cause a conventional doorbell to sound if so connected to the wires.

The faceplate 135 may extend from the bottom of the device 130 up to just below the camera 134. The faceplate 135 may be formed of any suitable material, including, without limitation, metals, such as brushed aluminum or stainless steel, metal alloys, and plastics, and any combination thereof. The faceplate 135 protects the internal contents of the device 130 and serves as an exterior front surface of the device 130. The faceplate 135 may include an aperture 136a with a flexible translucent membrane 136 for movably holding the button 133. The faceplate 135 is also formed with at least one speaker grille 180 to allow sound generated within the housing 131 to exit. The button 133 and the flexible translucent membrane 136 may have various profiles that may or may not match the profile of the faceplate 135. The flexible translucent membrane 136 may comprise any suitable material, including, without limitation, a transparent silicone, plastic, or rubber, that is configured for allowing light produced within the device 130 to pass through and is sufficiently flexible to allow the button 133 to be pressed. The light may be produced by one or more light-emitting components, such as light-emitting diodes (LEDs), contained within the device 130, as further described below. The button 133 and/or the flexible translucent membrane 136 contacts a switch cover (see the switch cover 184 of FIG. 19) located within the device 130 when the button 133 is pressed by a visitor. When pressed, the button 133 may trigger one or more functions of the device 130, as further described below.

The motion sensor 132 may be, for example, one or more passive infrared (PIR) sensors that detect motion using the infrared wavelength, but may be any type of sensor configured for detecting and communicating the presence of motion and/or a heat source within their field of view. The motion sensor 132 may be configured to detect motion using any methodology, including but not limited to methodologies that do not rely on detecting the presence of a heat source within a field of view, without departing from the scope hereof. In certain embodiments, the infrared-transparent lens 132a may be a Fresnel lens patterned to focus incoming light onto the at least one motion sensor 132 located within the device 130. The infrared transparent lens 132a may be substantially coplanar with a front surface 131F of the housing 131. In alternative embodiments, the infrared-transparent lens 132a may be recessed within the housing 131 or may protrude outward from the housing 131. The infrared-transparent lens 132a may extend and curl partially around the side of the device 130 without departing from the scope hereof. The at least one motion sensor 132 is configured to sense a presence and/or motion of an object in front of the device 130. In certain embodiments, the optically-transparent lens 134a may be configured for focusing light into the camera 134 so that clear images may be taken. The camera 134 is configured for capturing video data when activated, as described below.

Figure 7:
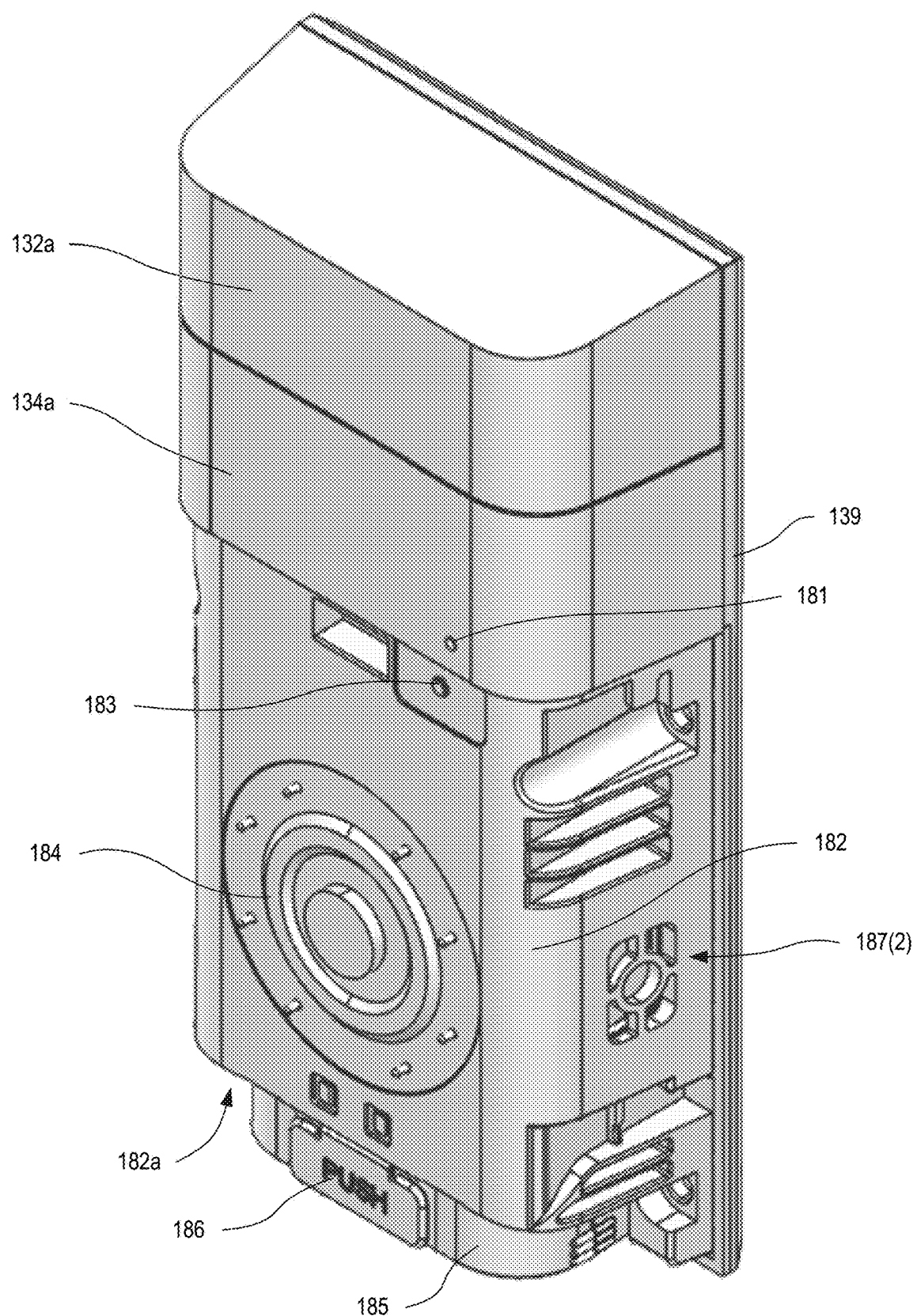
FIG. 7 is a front perspective view showing the audio/video recording and communication device of FIGS. 3-6 with a faceplate removed.
Figure 8:
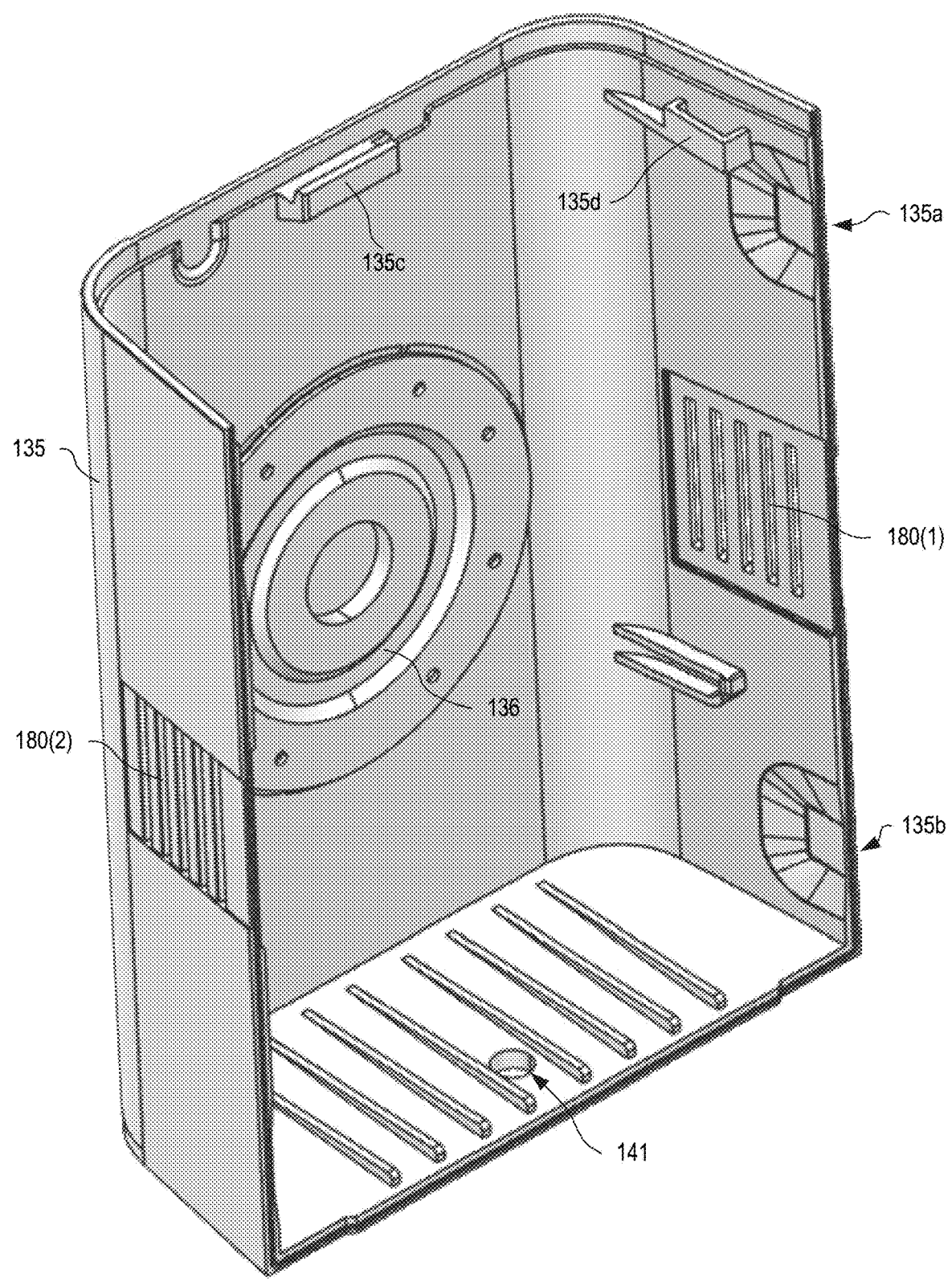
FIG. 8 is a reverse perspective view showing the faceplate removed from the audio/video recording and communication device of FIGS. 3-6.

FIG. 7 is a perspective view showing the device 130 with the faceplate 135 removed, and FIG. 8 is a reverse perspective view showing the faceplate 135 when removed from the device 130. Advantageously, the faceplate 135 may be removed from the device 130 without the need to remove the device 130 from a surface upon which it is mounted. With reference to FIG. 7, the support structure 182 within the housing 131 couples with the backplate 139 and supports a reset button 183. A switch cover 184 comprises another flexible translucent membrane, which may be similar to the flexible translucent membrane 136, and aligns with the button 133 and the flexible translucent membrane 136.

The support structure 182 positions and secures the backplate 139, the faceplate 135, the optically-transparent lens 134a, and the infrared-transparent lens 132a and supports internal components of the device 130. With reference to FIG. 8, a lower end of the faceplate 135 may include a security screw aperture 141 configured to receive a security screw 137 (FIG. 4) or other fastener(s) to retain the faceplate 135 on the device 130. As shown in FIG. 8, the faceplate 135 may have one or more detents 135a, 135b, and/or protrusions 135c, 135d, that interlock with corresponding features of the support structure 182 to secure the faceplate 135 onto the support structure 182.

Figure 10:
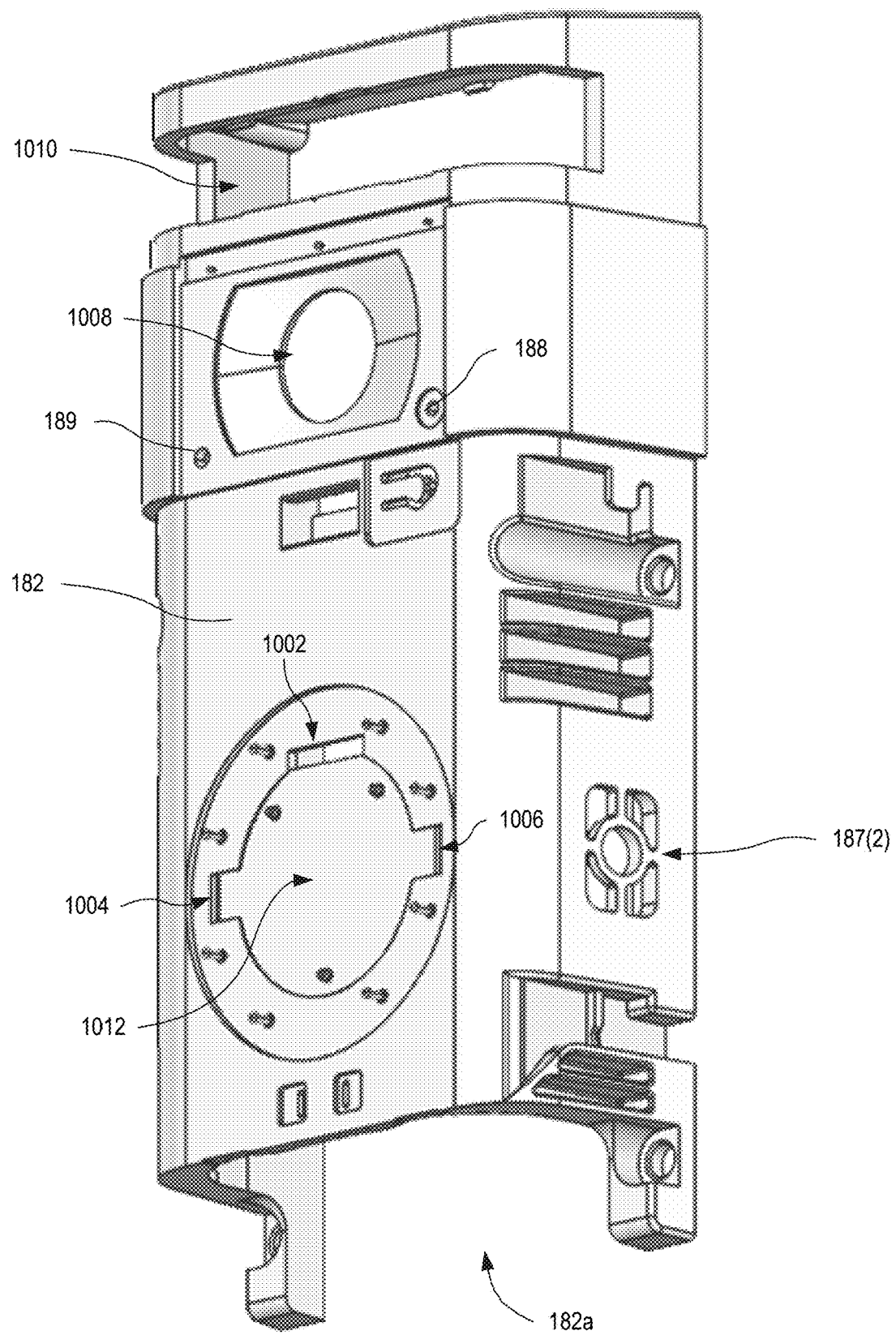
FIG. 10 is a front perspective view of the support structure of FIG. 9 illustrating a cavity, apertures, and structure for supporting components of the audio/video recording and communication device of FIGS. 3-6.
Figure 11:
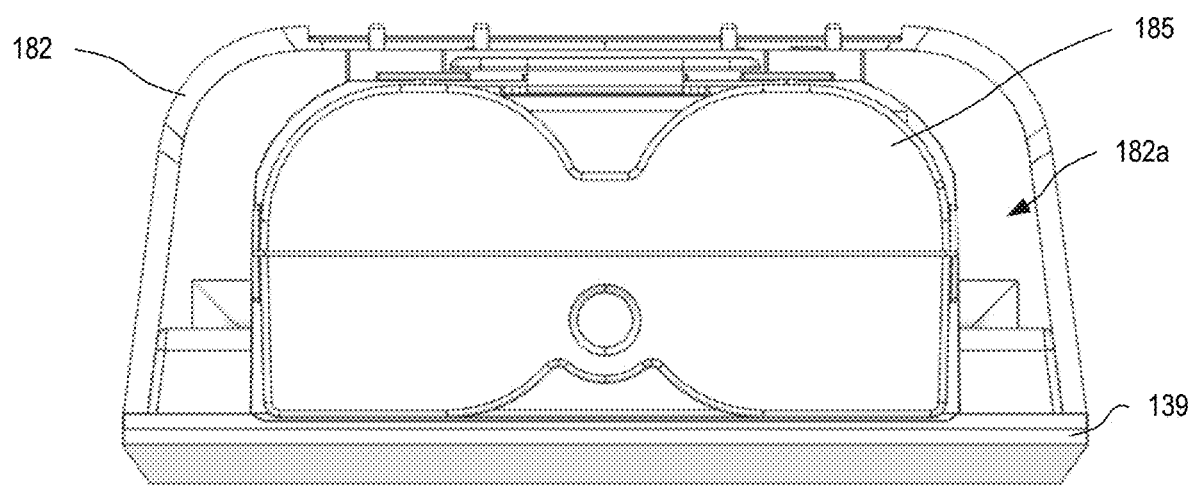
FIG. 11 is a bottom view of part of the audio/video recording and communication device of FIGS. 3-6 showing a removable battery casing within the cavity.

With reference to FIGS. 10 and 11, the support structure 182 forms a cavity 182a within the housing 131 for containing a removable battery casing 185 (FIGS. 11 and 12) that includes one or more batteries for powering electronics of the device 130. In one embodiment, the removable battery casing 185 contains at least one rechargeable battery and may be removed from the housing 131 for recharging without the need to remove the device 130 from its mounting surface. The support structure 182 is also formed with a plurality of sound apertures 187 that align with the speaker grilles 180 when the faceplate 135 is attached to the housing 131, as shown in FIG. 3.

Figure 9:
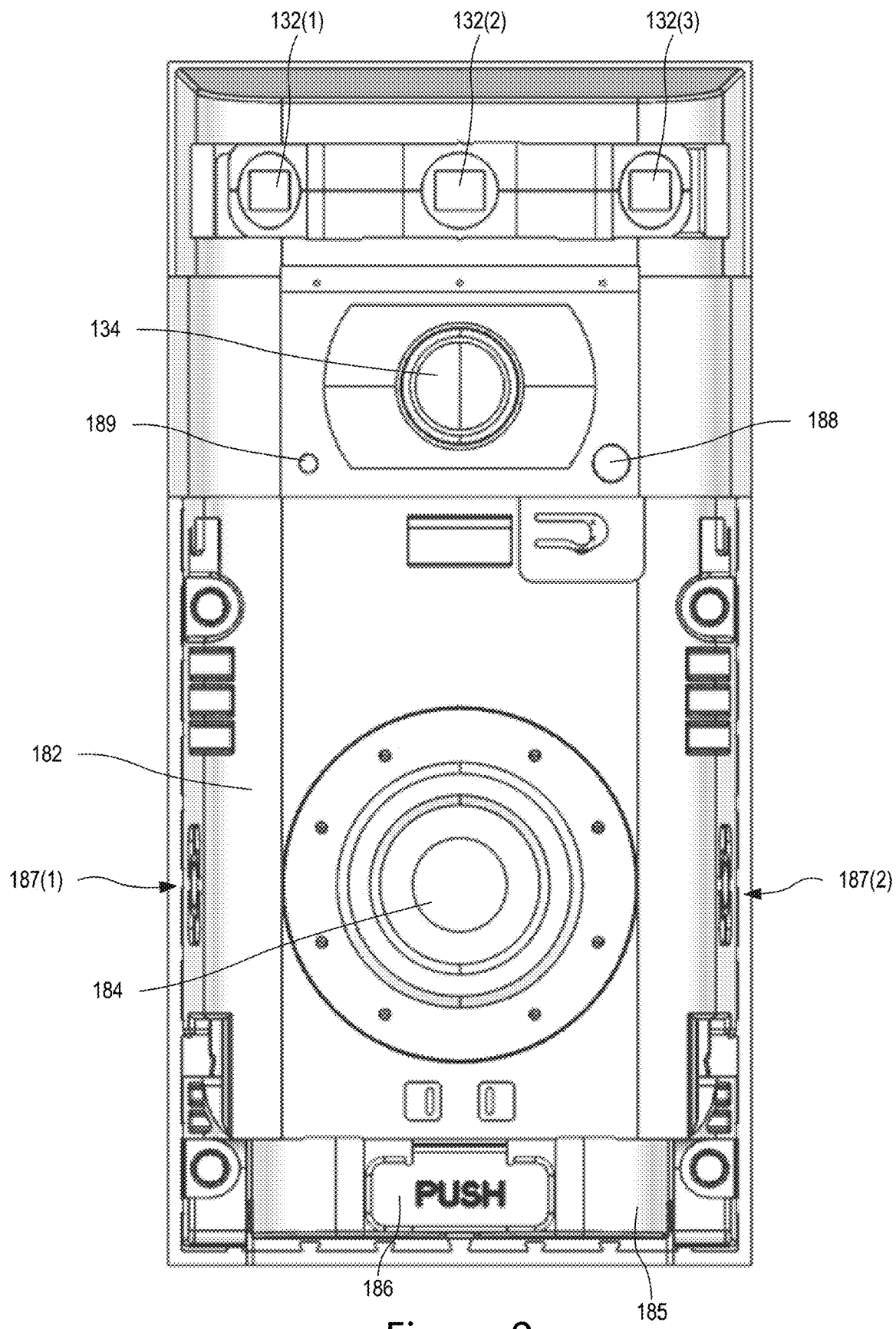
FIG. 9 is a front view of part of the audio/video recording and communication device of FIGS. 3-6 illustrating positioning of components by the support structure thereof.
Figure 12:
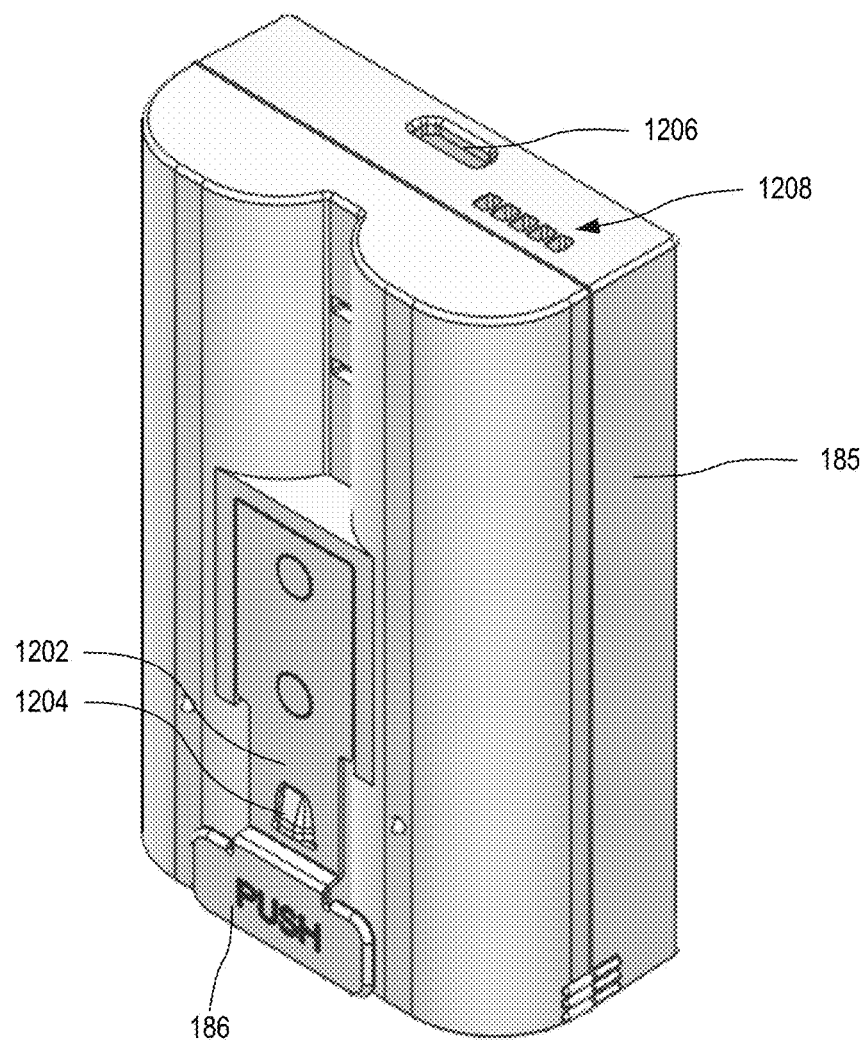
FIG. 12 is a front perspective view of the removable battery casing of the audio/video recording and communication device of FIGS. 3-6.

With reference to FIGS. 7, 9, and 12, the removable battery casing 185 has a release button 186 that couples with detents of the support structure 182 to retain the removable battery casing 185 within the cavity 182a. With the faceplate 135 removed, the release button 186 may be depressed and the removable battery casing 185 may be removed from the lower end of the cavity 182a. Particularly, the removable battery casing 185 may be removed from the device 130 without the need to remove the device 130 from a surface upon which it is mounted. The removable battery casing 185 may provide power to components of the device 130 while the device 130 receives power from the screw terminals 138, thereby engaging in a trickle-charge method of power consumption and supply. Alternatively, the device 130 may draw power directly from the screw terminals 138 while relying on power from the removable battery casing 185 only when the screw terminals 138 are not providing the power necessary for all functions of the device 130. Still further, removable battery casing 185 may comprise the sole source of power for device 130. In such embodiments, the screw terminals 138 may not be connected to a source of power. When the removable battery casing 185 is depleted of power, it may be removed from the device 130 and recharged, such as by connecting a power source (see e.g., connector 1206 of FIG. 12).

Figure 13:
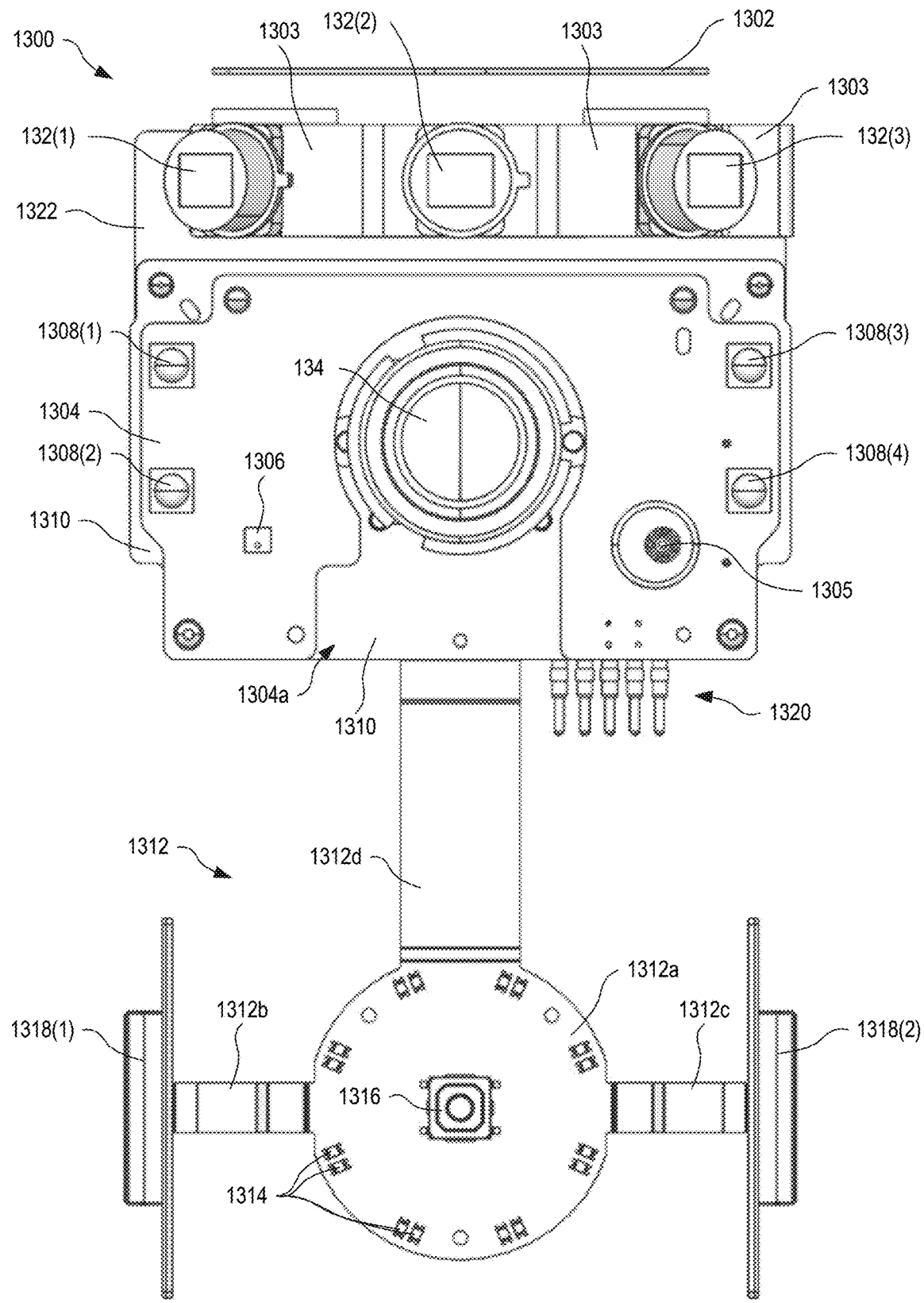
Figure 16:
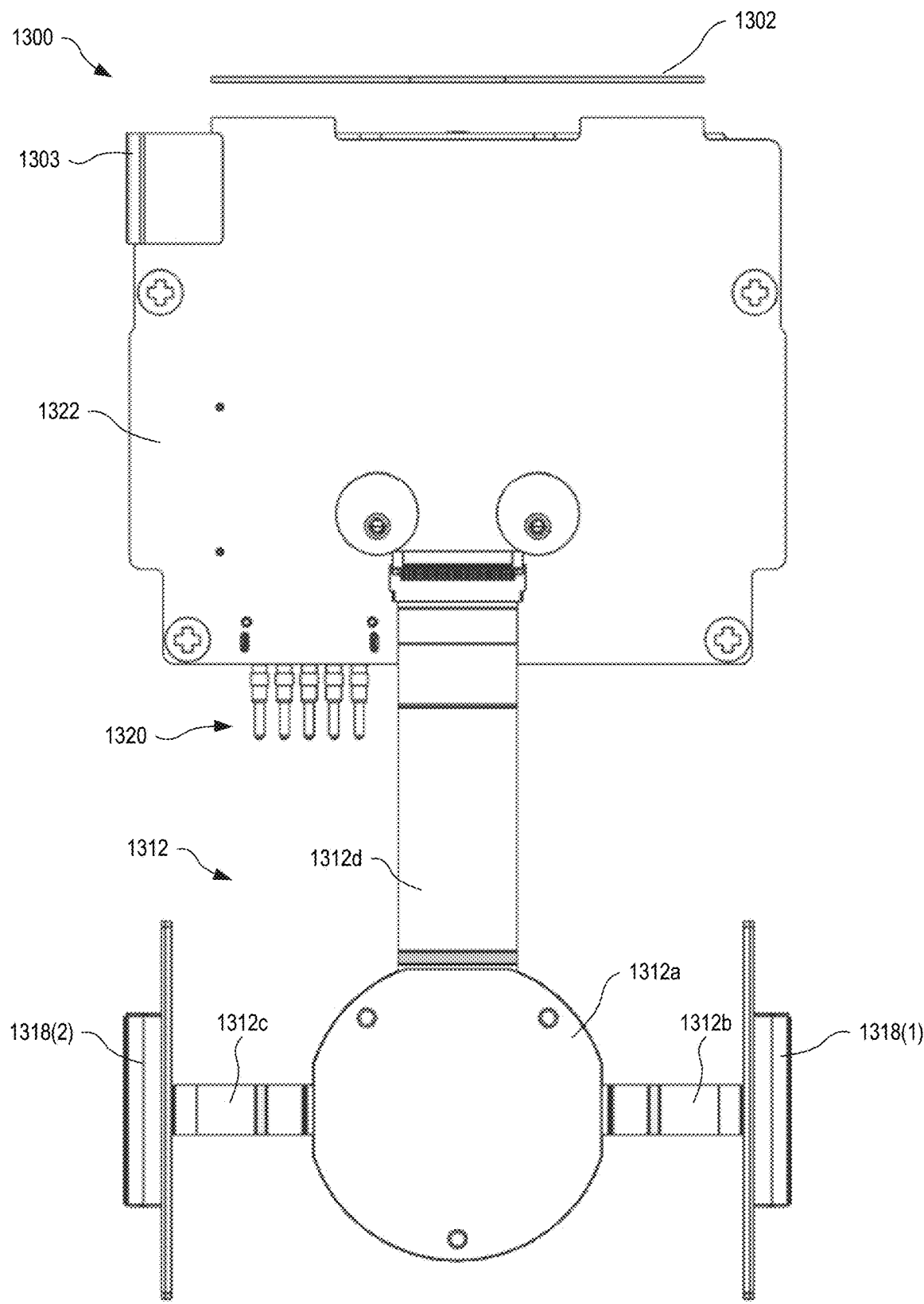

FIG. 9 is a front view of the device 130 with the optically-transparent lens 134*a*, the infrared-transparent lens 132*a*, and the faceplate 135 removed to illustrate positioning of the motion sensors 132, the camera 134, and other components, by the support structure 182. The support structure 182 includes a light aperture 189 that allows ambient light to reach a light sensor (see light sensor 1306 of FIG. 13) for detecting ambient light levels, and includes a sound aperture 188 that aligns with a sound aperture 181 of the optically-transparent lens 134*a* when the optically-transparent lens 134*a* is positioned on the device 130 as shown in FIG. 3.

FIG. 10 is a front perspective view of the support structure 182 illustrating the cavity 182*a* and other apertures and structure for supporting components of the device 130. FIG. 11 is a bottom view of the device 130 with the faceplate 135 removed to show the removable battery casing 185 within the cavity 182*a*. FIG. 12 is a perspective view of the removable battery casing 185 removed from the cavity 182*a*. With reference to FIG. 12, the release button 186 is positioned on a leaf-spring 1202 that has a protrusion 1204 that engages a detent of the support structure 182 to retain the removable battery casing 185 within the cavity 182*a*. When the release button 186 is pressed, the leaf-spring 1202 bends and the protrusion 1204 disengages with the detent and the removable battery casing 185 may be removed from the lower end of the cavity 182*a*. The removable battery casing 185 also includes a socket (e.g., a micro-USB connector) 1206 that allows the batteries within the removable battery casing 185 to be recharged, and a power socket 1208 that couples with electronics of the device 130, as described in further detail below.

Figure 17:
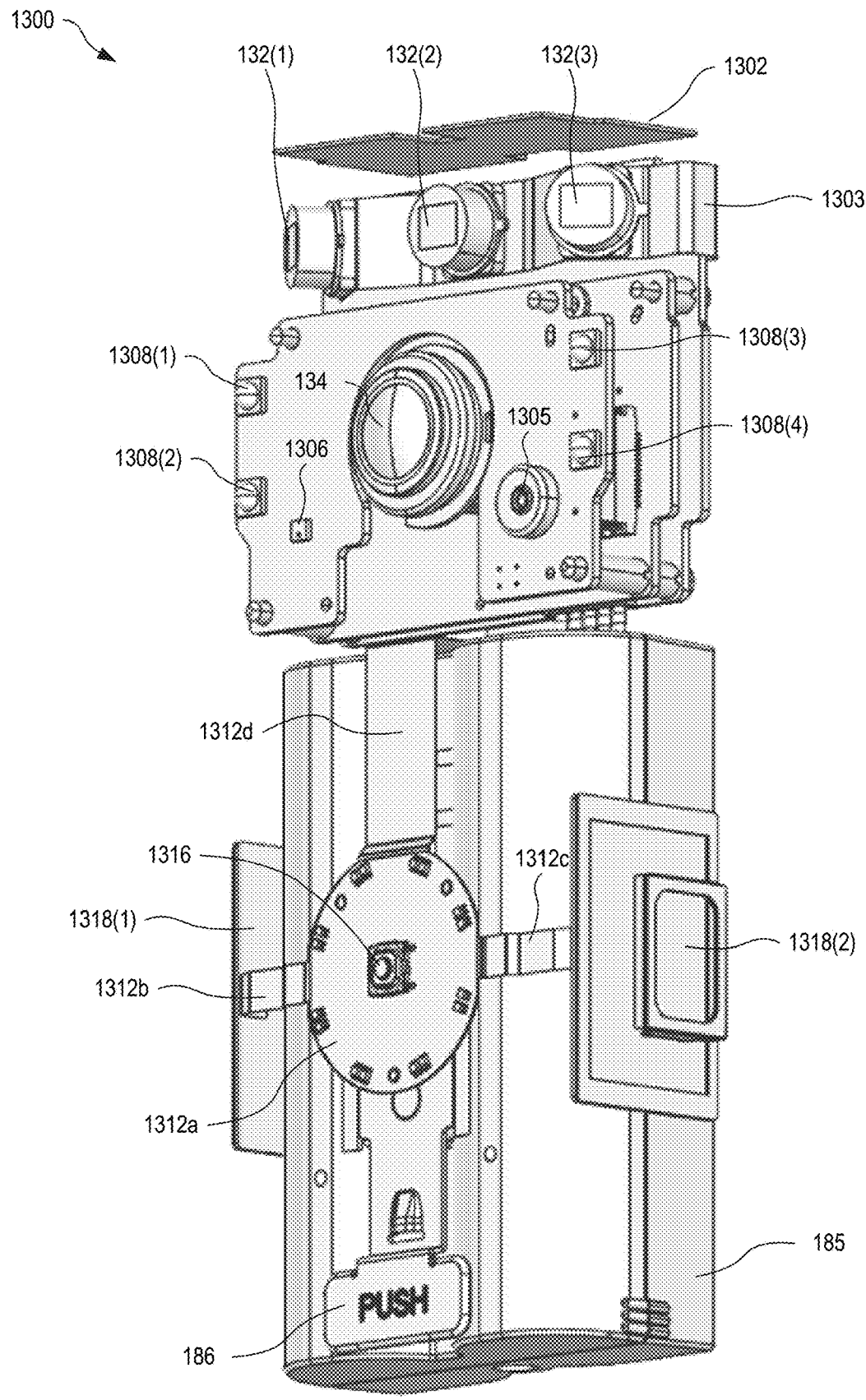
FIG. 17 is a front perspective view showing the electronic components of FIGS. 13-16 positioned around the removable battery casing of FIG. 12.
Figure 18:
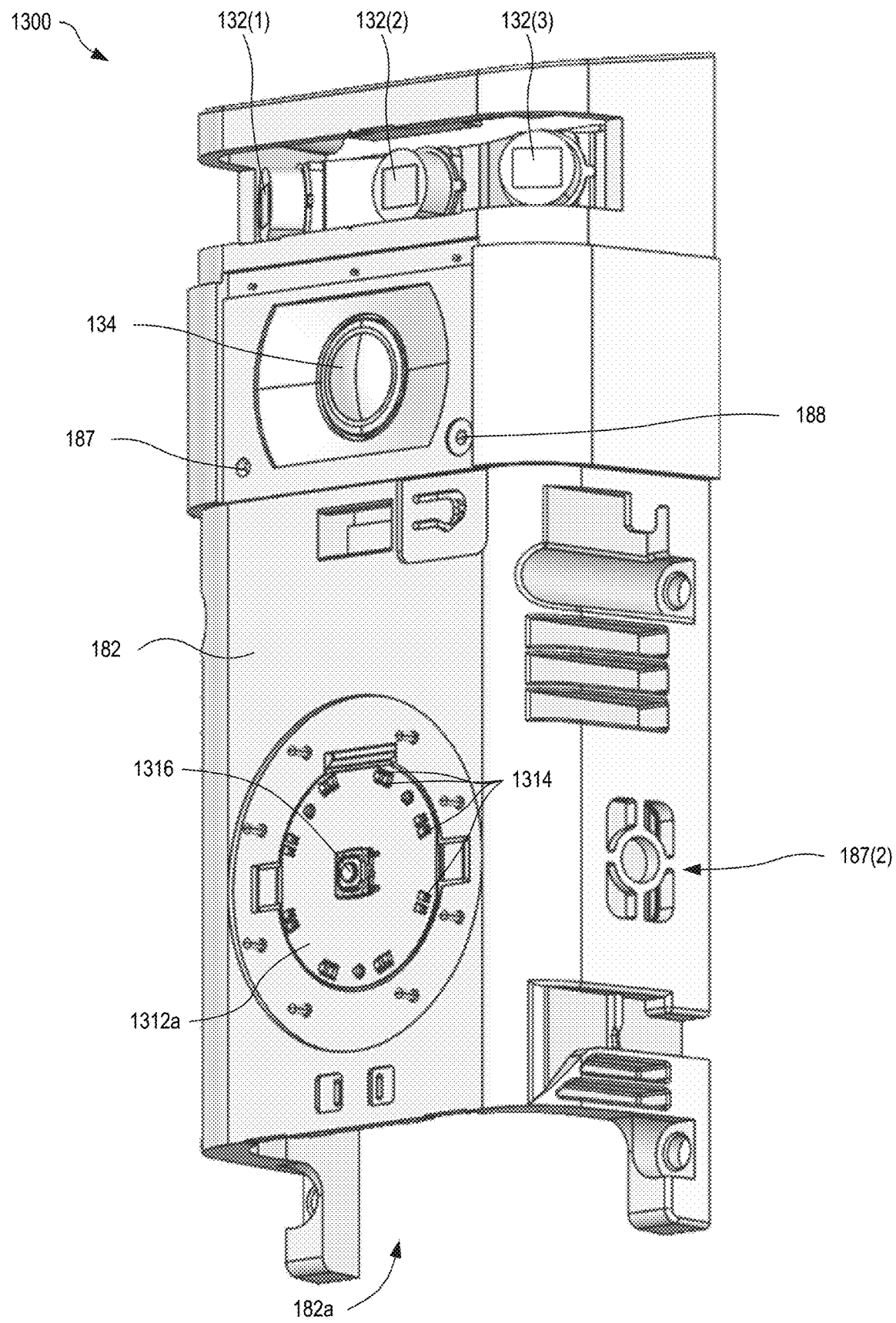
FIG. 18 is a front perspective view showing the electronic components of FIGS. 13-16 positioned within the support structure of FIG. 10.

FIGS. 13-16 show front, right, left, and back views, respectively, of electronic components 1300 of the device 130. FIG. 17 shows the electronic components 1300 of FIGS. 13-16 positioned around the removable battery casing 185. FIG. 18 shows the electronic components 1300 of FIGS. 13-16 positioned within the support structure 182. FIGS. 13-18 are best viewed together with the following description.

The electronic components 1300 include a plurality of printed circuit boards (PCBs), including an antenna board 1302, an infrared board 1304, a camera board 1310 configured with the camera 134, and a power board 1322. The electronic components 1300 further include a power flex circuit 1303 configured with the motion sensors 132, at least one speaker assembly 1318, a switch 1316, a plurality of light emitting elements 1314, a plurality of infrared light emitting elements 1308 (e.g., LEDs), an audio sensor 1305, a light sensor 1306, and a flex circuit 1312. The infrared board 1304, the camera board 1310 and the power board 1322 may be electrically interconnected and stacked together with the infrared board 1304 at the front and the power board 1322 at the rear of the device 130. The stacked boards may be secured to the support structure 182 using any suitable fasteners, such as screws, or interference connections, adhesives, and so on. The power board 1322 is configured with various components that enable the functionality of the power and device-control components, as further described below. The power board 1322 further includes a processor (not shown) and memory that stores machine readable instructions (e.g., software and/or firmware) that when executed by the processor control functionality of the device 130.

The camera board 1310 includes various components that enable functionality of the camera 134 for use within the device 130, as described below. The camera 134 protrudes through a cutaway portion 1304*a* of the infrared board 1304 and a camera aperture 1008 formed by the support structure 182. The infrared light emitting elements 1308 are positioned on the infrared board 1304 and operate to emit infrared light through the infrared-transparent lens 132*a* into the ambient environment. The infrared light emitting elements 1308 may be triggered to activate when a light sensor detects a low level of ambient light. The camera 134, which may be configured to detect infrared light, may then capture light emitted by the infrared light emitting elements 1308 as it reflects off objects within a field of view of the camera 134, so that the device 130 clearly captures images at night (may be referred to as "night vision"). The audio sensor 1305 (e.g., a digital microphone) is positioned by the infrared board 1304 to align with the sound aperture 188.

The power flex circuit 1303 electrically connects the motion sensors 132 to the power board 1322. The flex circuit 1312 forms a three-dimensional shape around the removable battery casing 185 to connect the switch 1316, the speaker assembly 1318, and the light emitting elements 1314 to the camera board 1310. The flex circuit 1312 is formed with a light board 1312*a* that positions the light emitting elements 1314 (e.g., light emitting diodes) around the switch 1316. The switch 1316 aligns, when the device 130 is assembled as shown in FIG. 17, with the button 133 such that when the button 133 is pressed, the switch 1316 changes an electrical connection. The light emitting elements 1314 align, when the device 130 is assembled as shown in FIG. 17, with the flexible translucent membrane 136 such that light emitted from the light emitting elements 1314 propagates through the flexible translucent membrane 136.

The light board 1312*a* is positioned against a front surface 1012 of the support structure 182, which functions to support the switch 1316 against movement of the button 133 when pressed. From the light board 1312*a*, the flex circuit portion 1312*b* passes through the aperture 1004 of the support structure 182, around part of the removable battery casing 185, and connects to the speaker assembly 1318(1). Similarly, from the light board 1312*a*, the flex circuit portion 1312*c* passes through the aperture 1006 of the support structure 182, around a different part of the removable battery casing 185, and connects to the speaker assembly 1318(2). From the light board 1312*a*, the flex circuit portion 1312*d* passes through the aperture 1002 of the support structure 182, around a different portion of the removable battery casing 185, and connects to the camera board 1310.

The power board 1322 includes a power plug 1320 that removably connects with the power socket 1208 of the removable battery casing 185 when the removable battery casing 185 is inserted into the cavity 182*a*. The power board 1322 also includes a communication module 164 that uses the antenna board 1302 to facilitate communication with network devices, such as client devices, servers, etc., in one or more remote locations, as further described below.

Figure 19:
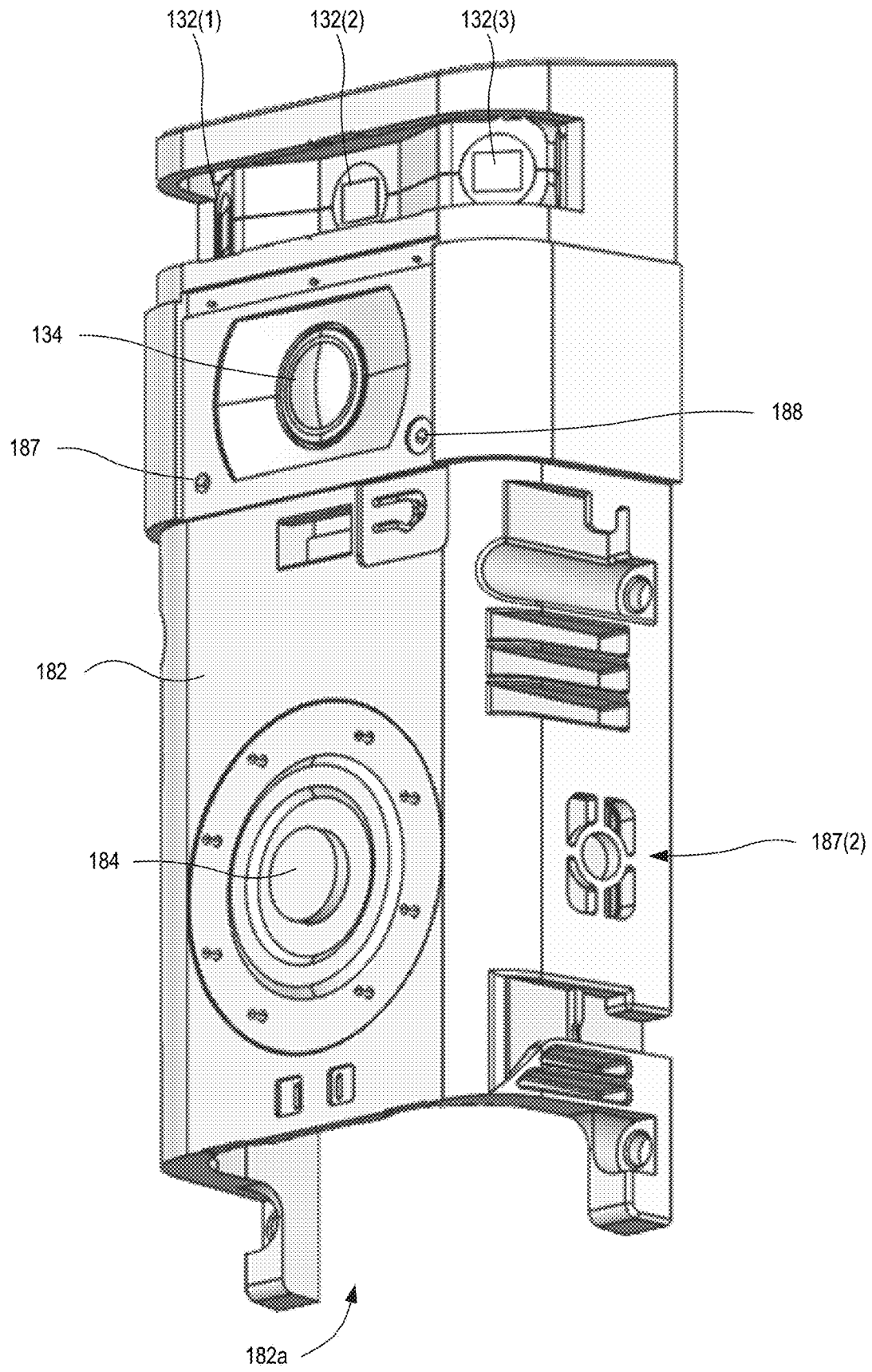
FIG. 19 is a front perspective view showing the electronic components of FIGS. 13-16 positioned within the support structure of FIG. 10 and a switch cover positioned over the light board, the light emitting elements, and the switch.

FIG. 19 is similar to FIG. 18 showing electronic components 1300 of FIGS. 13-16 positioned within the support structure 182, and further shows the switch cover 184 positioned over the light board 1312*a*, the light emitting elements 1314, and the switch 1316. The switch cover 184 thereby protects the light board 1312*a*, the light emitting elements 1314, and the switch 1316 when the faceplate 135 is removed.

Figure 20:
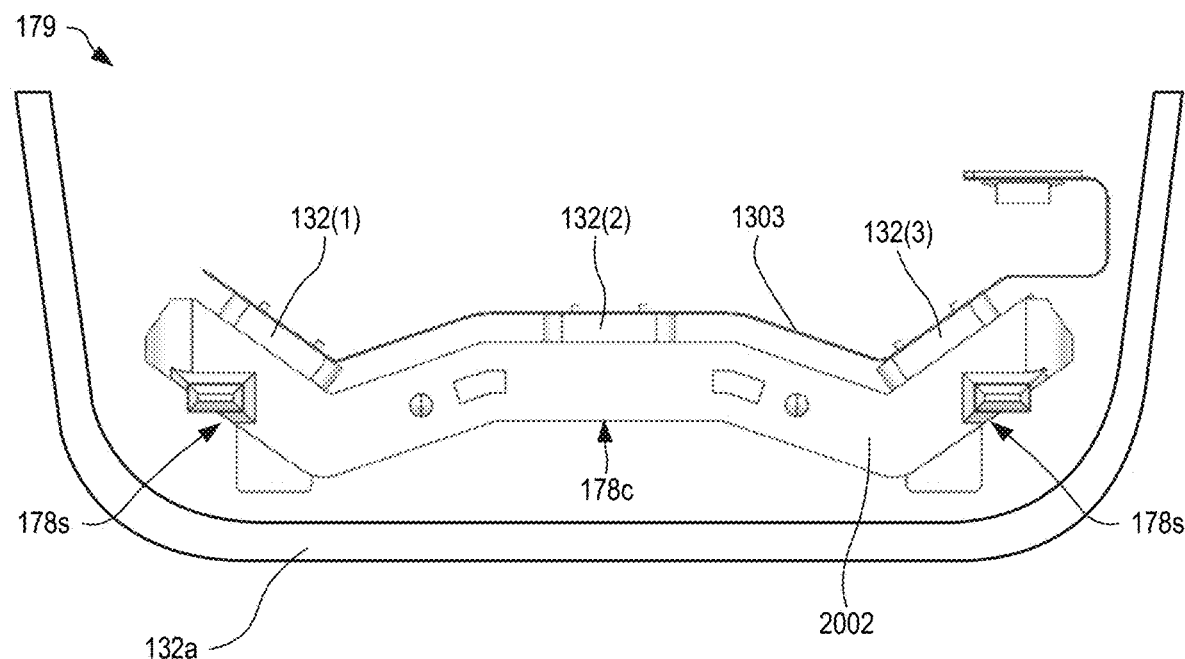
FIG. 20 is a top view showing a sensor assembly that includes an infrared-transparent lens, motion sensors, and a power flex circuit of the audio/video recording and communication device of FIGS. 3-6 positioned by a sensor holder, in an embodiment.
Figure 21:
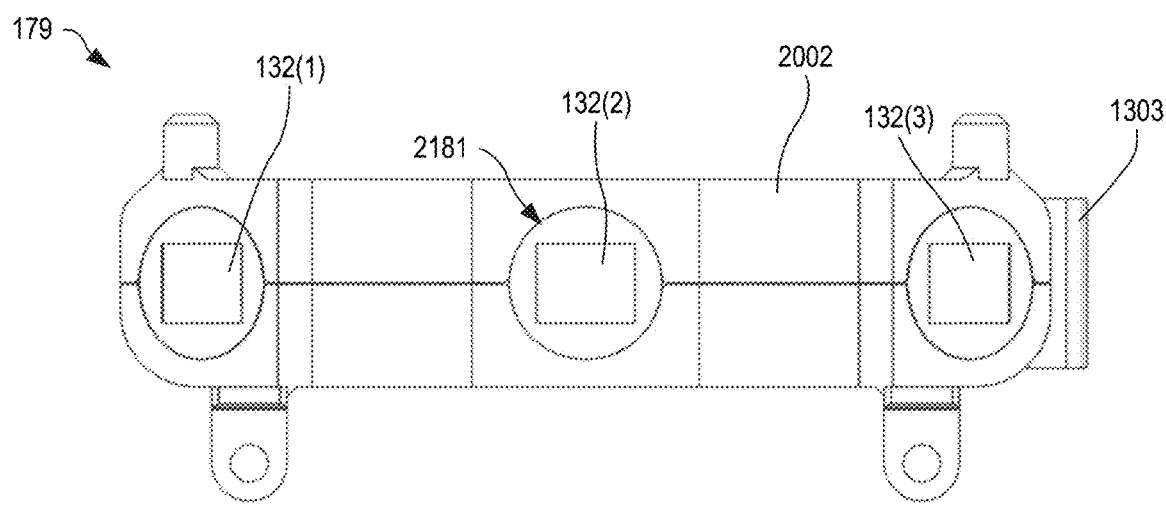
FIG. 21 is a front view of the sensor assembly of FIG. 20 without the infrared-transparent lens.

FIG. 20 is a top view showing a sensor assembly 179 that includes the infrared-transparent lens 132*a*, the motion sensors 132 and the power flex circuit 1303 positioned by a sensor holder 2002. FIG. 21 is a front view of the motion sensors 132 attached to the power flex circuit 1303 and positioned by the sensor holder 2002, omitting the infrared-transparent lens 132*a* for clarity of illustration.

The sensor holder 2002, when positioned within the PIR aperture 1010 of the support structure 182 is configured to mount the motion sensors 132 facing out through the infrared-transparent lens 132*a* at varying angles, thereby expanding a field of view of the motion sensors 132 to at least 180° and also allows the field of view to be broken up into various zones, as further described below. With reference to FIG. 20, the sensor holder 2002 may include one or more faces 178, including a center face 178*c* and two side faces 178*s* to either side of the center face 178*c*. With reference to FIG. 21, each of the faces 178 defines an opening 2181 within, or adjacent to, which the motion sensors 132 may be mounted. In alternative embodiments, the faces 178 may not include the openings 2181, but may instead comprise solid flat faces upon which the motion sensors 132 may be mounted. Generally, the faces 178 may be any physical structure configured for housing and/or securing the motion sensors 132 in place.

With reference to FIG. 21, the sensor holder 2002 may be secured to an inside surface of the support structure 182 (FIG. 19). The power flex circuit 1303 may be any material or component configured for delivering power and/or data to and from the motion sensors 132, and may be contoured to conform to the non-linear shape of the sensor holder 2002. The power flex circuit 1303 may connect to, draw power from, and/or transmit data to and from, the power board 1322.

Figure 22:
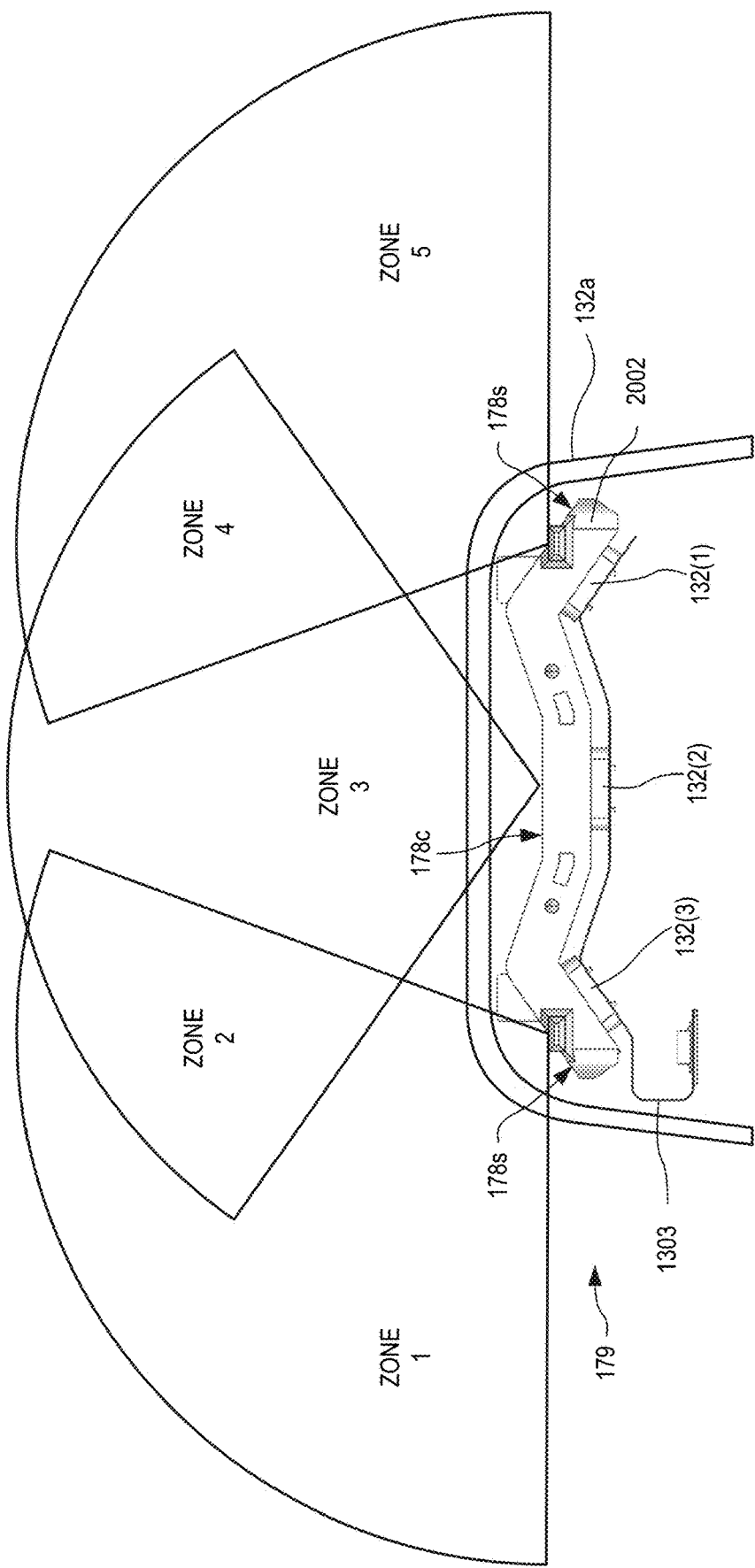
FIG. 22 is a top view of the sensor assembly of FIG. 20 illustrating fields of view of each of the motion sensors as positioned by the sensor holder.

FIG. 22 is a top view of the sensor assembly 179 illustrating the fields of view of each motion sensor 132 as positioned by the sensor holder 2002. In the illustrated embodiment, the side faces 178*s* of the sensor holder 2002 are angled to face 55° outward from the center face 178*c*, and each motion sensor 132 has a field of view of 110°. However, these angles may be increased or decreased as desired. Zone 1 is the area that is detectable only by the motion sensor 132(3). Zone 2 is the area that is detectable by both the motion sensor 132(3) and the motion sensor 132(2). Zone 3 is the area that is detectable by only the motion sensor 132(2). Zone 4 is the area that is detectable by both the motion sensor 132(2) and the motion sensor 132(1). Zone 5 is the area that is detectable by only the motion sensor 132(1). In some embodiments, the device 130 may be configured for determining the direction that an object is moving based upon timing of triggered zones.

Figure 23:
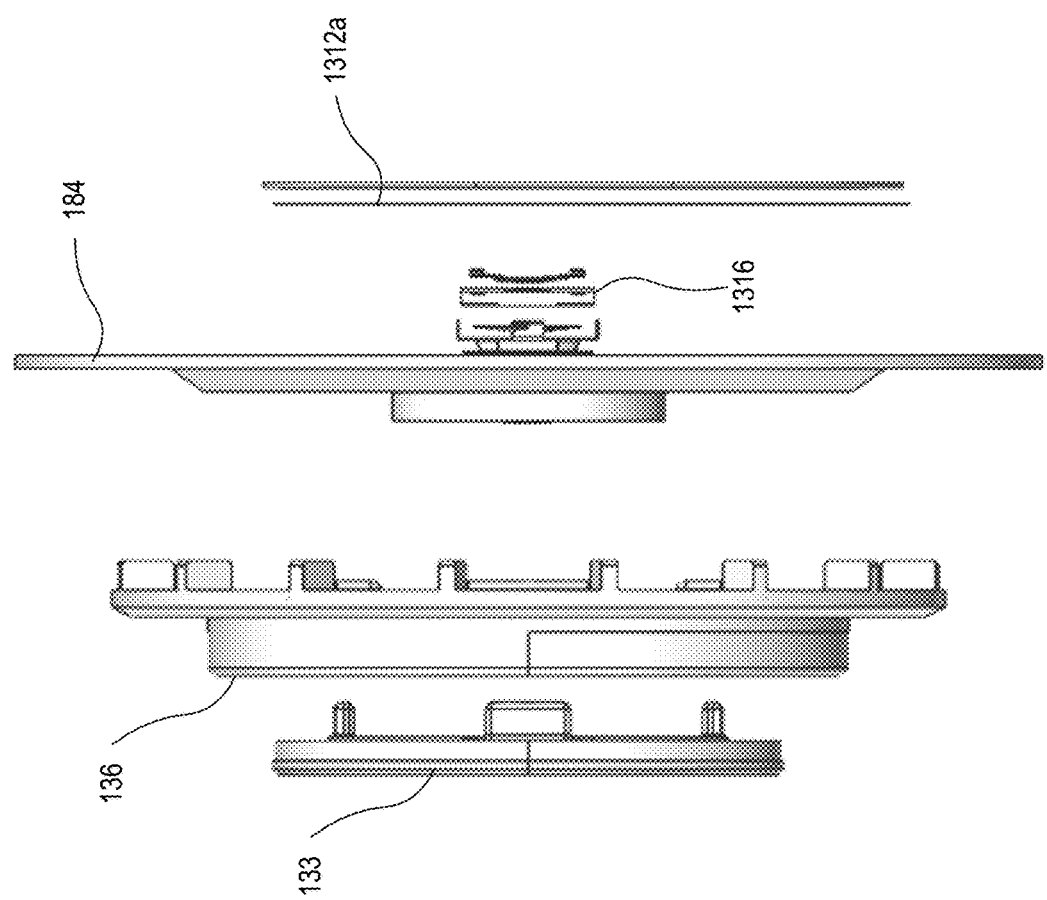
FIG. 23 is an exploded right-side view of a button, a flexible translucent membrane, a switch cover, the switch, and the light board of the flex circuit of FIGS. 13-17.

FIG. 23 is an exploded view of the button 133, the flexible translucent membrane 136, the switch cover 184, the switch 1316, and the light board 1312*a* of the flex circuit 1312.

In embodiments shown herein, the front button (e.g., the button 133 of FIG. 3) mechanically couples with a mechanical/electrical switch (e.g., the switch 1316) for detecting when the button is pressed. It is contemplated, however, that the front button and the switch may be implemented using a tactile sensor that is non-moving and where activation is detected based upon capacitance, for example.

Figure 24:
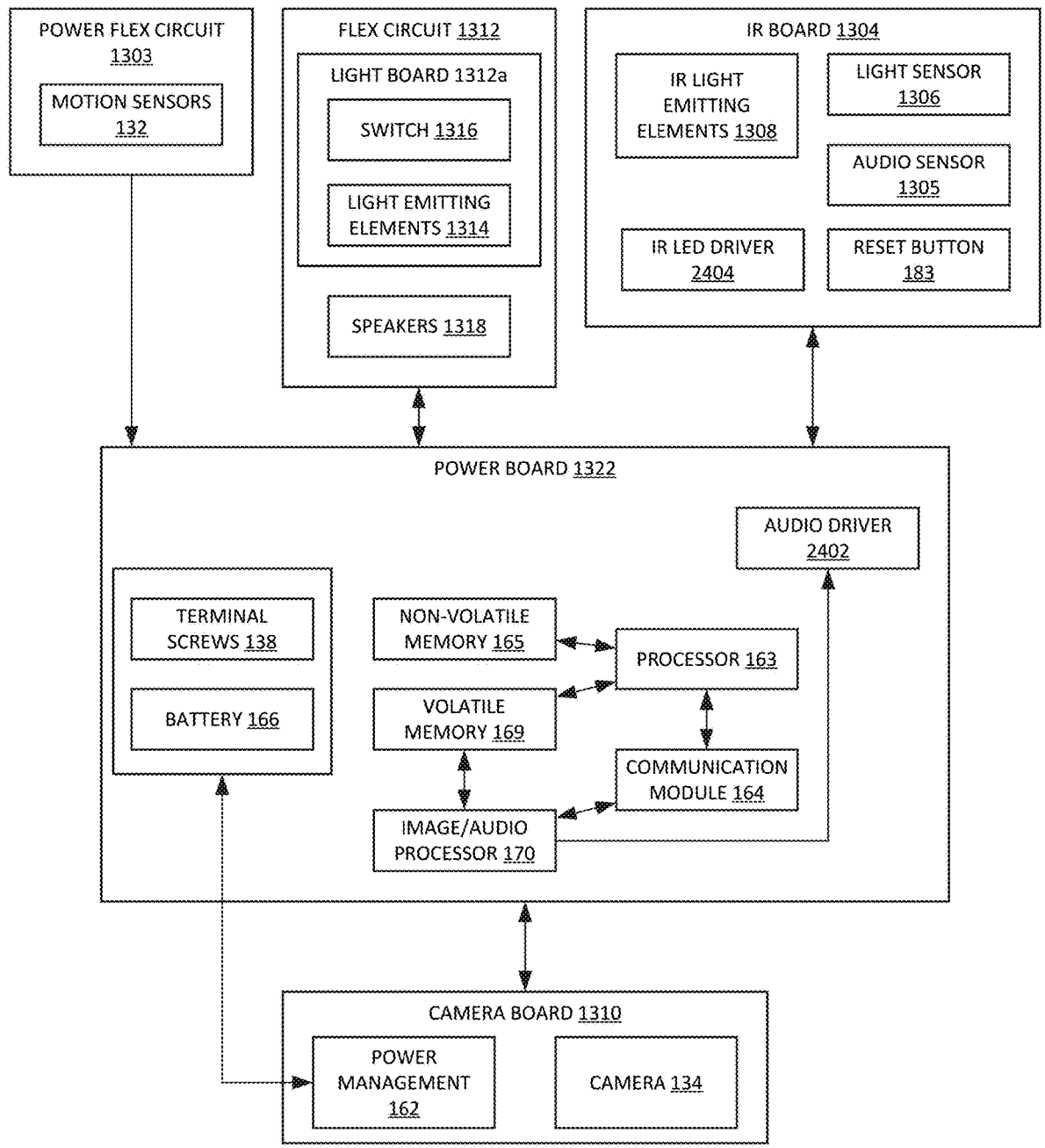
FIG. 24 is a functional block diagram illustrating components within or in communication with the audio/video recording and communication device of FIGS. 3-6.

FIG. 24 is a functional block diagram of the components within or in communication with the device 130 of FIGS. 3-6, according to an aspect of the present embodiments. The screw terminals 138 may be electrically and/or mechanically coupled to the power board 1322. The screw terminals 138 may receive electrical wires located at the surface to which the device 130 is mounted, such as the wall of a building, so that the device 130 may receive electrical power from the building's electrical system. Upon the screw terminals 138 being secured, AC mains power may be transferred to the power board 1322.

The infrared board 1304 includes the light sensor 1306, one or more infrared light emitting elements 1308, such as infrared light emitting diodes, and the audio sensor 1305 (e.g., microphone). The light sensor 1306 may represent one or more sensors configured for detecting the level of ambient light of the environment surrounding the device 130. The infrared light emitting elements 1308 may be one or more light-emitting diodes configured for producing infrared light when supplied with power. The audio sensor 1305 may be an acoustic-to-electric transducer or sensor configured for converting sound waves into an electrical signal.

The flex circuit 1312 includes the light board 1312*a* and at least one speaker assembly 1318. The light board 1312*a* includes the switch 1316 and the light emitting elements 1314. The flex circuit 1312 and its components electrically couple with the power board 1322, thereby allowing data and/or power to be transferred to and from the power board 1322 and the flex circuit 1312. The speaker assembly 1318 may be any electromechanical device configured for producing sound in response to an electrical signal input. When activated, the light emitting elements 1314 may illuminate the flexible translucent membrane 136 (see FIG. 3). In certain embodiments, a processor 163 generates one or more patterns for the light emitting elements 1314 and functions as, or cooperates with a light emitting element (or LED) pattern controller.

The power board 1322 may include the processor 163 (also referred to as "microcontroller," "CPU," and "controller"), non-volatile memory 165, volatile memory 169, a communication module 164, and an image/audio processor 170. The speaker assembly 1318 and the audio sensor 1305 may be electrically coupled to the image/audio processor 170. Digital audio transferred between the user's client device 114 and the speaker assembly 1318 and the audio sensor 1305 may be compressed and decompressed using an audio CODEC implemented within the image/audio processor 170. Once compressed by the image/audio processor 170, digital audio data may be sent through the communication module 164 to the network 112, routed by one or more servers 118, and delivered to the user's client device 114 (FIG. 1). When the user speaks, after being transferred through the network 112, digital audio data containing the speech is decompressed by the image/audio processor 170 and emitted to the visitor via an audio driver 2402 and the speaker assembly 1318.

In certain embodiments, the processor 163 is an integrated circuit including a processor core, memory, and programmable input/output peripherals. The processor 163 may receive input signals, such as data and/or power, from the motion sensors 132, the light sensor 1306, the audio sensor 1305, and/or the communication module 164, and may perform various functions as further described below. When triggered by the motion sensors 132, the processor 163 may perform one or more functions. When the light sensor 1306 detects a low level of ambient light, the light sensor 1306 may trigger the processor 163 to enable night vision, as further described below. The processor 163 may also act as a conduit for data communicated between various components and the communication module 164. In certain embodiments, when motion is detected (e.g., by the camera 134 and/or by the motion sensors 132) under conditions of low ambient light, the processor 163 may activate the light emitting elements 1314 to emit light through the flexible translucent membrane 136. For example, where the motion sensors 132 indicate motion is detected in front of the device 130 and the light sensor 1306 detects a low level of ambient light, the processor 163 may activate the light emitting elements 1314 to emit light proximate the button 133. This functionality may advantageously assist a visitor in locating and actuating the button 133 under conditions of low ambient light.

In certain embodiments, the communication module 164 is an integrated circuit including a processor core, memory, and programmable input/output peripherals. The communication module 164 may be configured to transmit data wirelessly (e.g., using the antenna board 1302) to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera board 1310, the processor 163, the switch 1316, the reset button 183, and/or the non-volatile memory 165. When the switch 1316 is activated (e.g., when the button 133 is pressed), the communication module 164 may be triggered to perform one or more functions. When the reset button 183 is pressed, the communication module 164 may be triggered to erase any data stored in the non-volatile memory 165. The communication module 164 may also act as a conduit for data communicated between various components and the processor 163. The non-volatile memory 165 may comprise flash memory configured to store and/or transmit data. For example, in certain embodiments the non-volatile memory 165 is serial peripheral interface (SPI) flash memory.

The camera board 1310 may include a power management module 162, the camera 134, and components that facilitate the operation of the camera 134. For example, the camera 134 may include a video recording sensor and/or a camera chip. In certain embodiments, the camera 134 includes a complementary metal-oxide semiconductor (CMOS) array, and is configured for capturing high definition (e.g., 1080p or better) video. The camera 134 is communicatively coupled to the image/audio processor 170 of the power board 1322. The image/audio processor 170 may include an encoding and compression chip for encoding and compressing captured video. In some embodiments, the image/audio processor 170 may include a bridge processor. The image/audio processor 170 may concurrently process video captured by the camera 134 and audio sensed by the audio sensor 1305 to generate data of a format suitable for wireless transfer by the communication module 164 to a network (e.g., the network 110 and/or the network 112).

In certain embodiments, the power management module 162 includes an integrated circuit configured for arbitrating between multiple voltage rails, thereby selecting the source of power for the device 130. The removable battery casing 185 and/or the screw terminals 138 may each provide electrical power to the power management module 162. The power management module 162 may have separate power rails dedicated to the removable battery casing 185 and the screw terminals 138. In one embodiment, the power management module 162 continuously draws power from the removable battery casing 185 to power the device 130, while at the same time routing power from the screw terminals 138 to the removable battery casing 185, thereby allowing the battery within the removable battery casing 185 to maintain a substantially constant level of charge ("trickle" charging). Alternatively, the power management module 162 may continuously draw power from the screw terminals 138 to power the device 130, while only drawing power from the removable battery casing 185 when the power from the screw terminals 138 is low or insufficient. In other embodiments, the removable battery casing 185 is the only source of power for the device 130. In such embodiments, the screw terminals 138 may not be connected to a source of power. When the removable battery casing 185 is depleted of its charge, it may be recharged, such as by removing the faceplate 135 from the housing 131, removing the removable battery casing 185 from the cavity 182a, and connecting a power source to the connector 1206.

In certain embodiments, the faceplate 135 may be configured with one or more solar panels 140 (see FIG. 4) that electrically connect with the power management module 162 when the faceplate 135 is coupled with the support structure 182. For example, the faceplate 135 may include one or more solar panels 140 configured with an outer surface of the faceplate 135 and that electrically couple with at least two electrical contacts (not shown) formed on an inner surface of the faceplate 135. The support structure 182 may also include at least two electrical contacts (not shown) that electrically connect with the electrical contacts of the faceplate 135, when the faceplate 135 is attached to the support structure 182, to electrically connect the solar panels to the power management module 162. The power management module 162 may then charge the battery within the removable battery casing 185 with power from the solar panels 140.

The power management module 162 may include other functionality such as one or more of: AC/DC conversion, Always ON 3.3V LDO regulator, AC power switch, Trickle charge regulator, AC presence detector, Charge current limit disable switch, Solar charge efficiency enhancer, and power regulators supporting the camera 134. The camera board 1310 may also include other logic such as one or more of: AP Mode logic, Reset logic, Back button time delay circuit, Wi-Fi Wake up logic, Factory restore latch, Reset/Front button latches, and an Alarm latch.

The image/audio processor 170 may use the volatile memory 169 to buffer and/or encode video data captured by the camera 134. In certain embodiments, the volatile memory 169 may be synchronous dynamic random access memory (SD RAM).

The infrared light emitting elements 1308 may comprise light-emitting diodes configured for radiating infrared light. The camera 134 may be configured to capture infrared light. In certain embodiments, the processor 163 and/or the image/audio processor 170 may selectively switch the camera 134 between capturing visible light video and capturing infrared light video. When the light sensor 1306 detects a low level of ambient light (which may comprise a level that impedes the performance of the camera 134 in the visible spectrum), the image/audio processor 170 may activate the infrared light emitting elements 1308 to shine infrared light through the optically-transparent lens 134a into the environment in front of the device 130, and switch the camera 134 to capture infrared light reflected or refracted by objects within the field of view of the camera 134. This process provides the device 130 with the "night vision" function mentioned above. In some embodiments, each pixel of the camera 134 may include red, green, blue, and infrared sensors such that the camera 134 is configured to capture images during both daylight and nighttime hours without the need for an infrared cut filter or other hardware to switch between daytime and nighttime modes.

As discussed above, the present disclosure provides numerous examples of methods and systems including audio/video recording and communication devices configured as doorbells, but the disclosed embodiments are equally applicable for audio/video recording and communication devices other than doorbells. For example, the present embodiments may include one or more audio/video recording and communication devices configured as security cameras instead of, or in addition to, one or more audio/video recording and communication devices configured as doorbells. An example audio/video recording and communication device configured as a security camera may include substantially all of the structure and functionality of the device 130, but without the front button 133, the switch cover 184, and/or the flexible translucent membrane 136. An example audio/video recording and communication device configured as a security camera may further omit other components without departing from the scope hereof.

The couplings described herein may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 25:
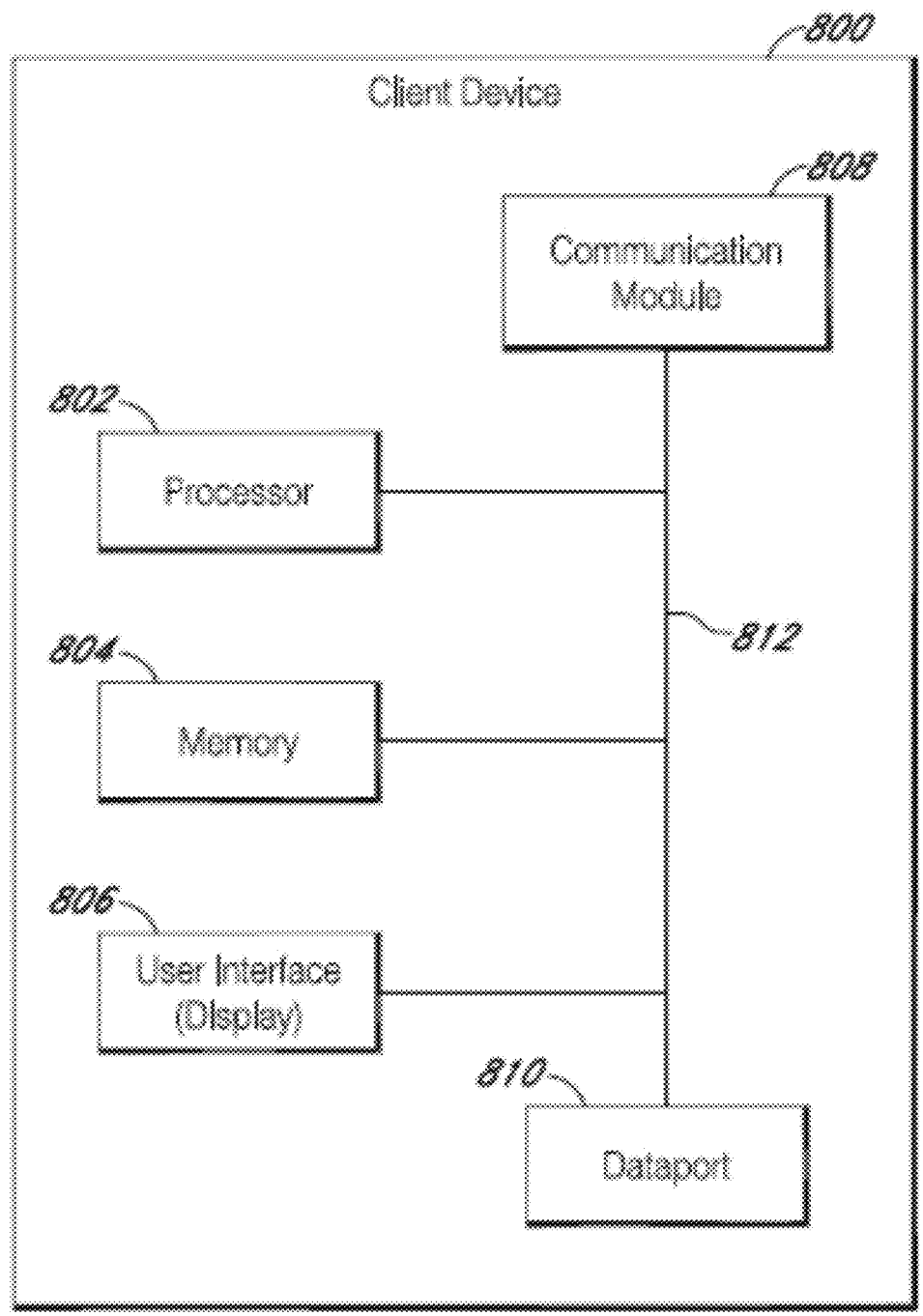
FIG. 25 is a functional block diagram of a client device on which the present embodiments may be implemented according to various aspects of the present disclosure.

FIG. 25 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 is, for example, a smartphone.

The client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In certain embodiments, the processor 802 includes one or more other processors, such as one or more microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In certain embodiments, the memory 804 includes a combination of magnetic, optical, and/or semiconductor memory, and may include, for example, RAM, ROM, flash drive, and/or a hard disk or drive. The processor 802 and the memory 804 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 26:
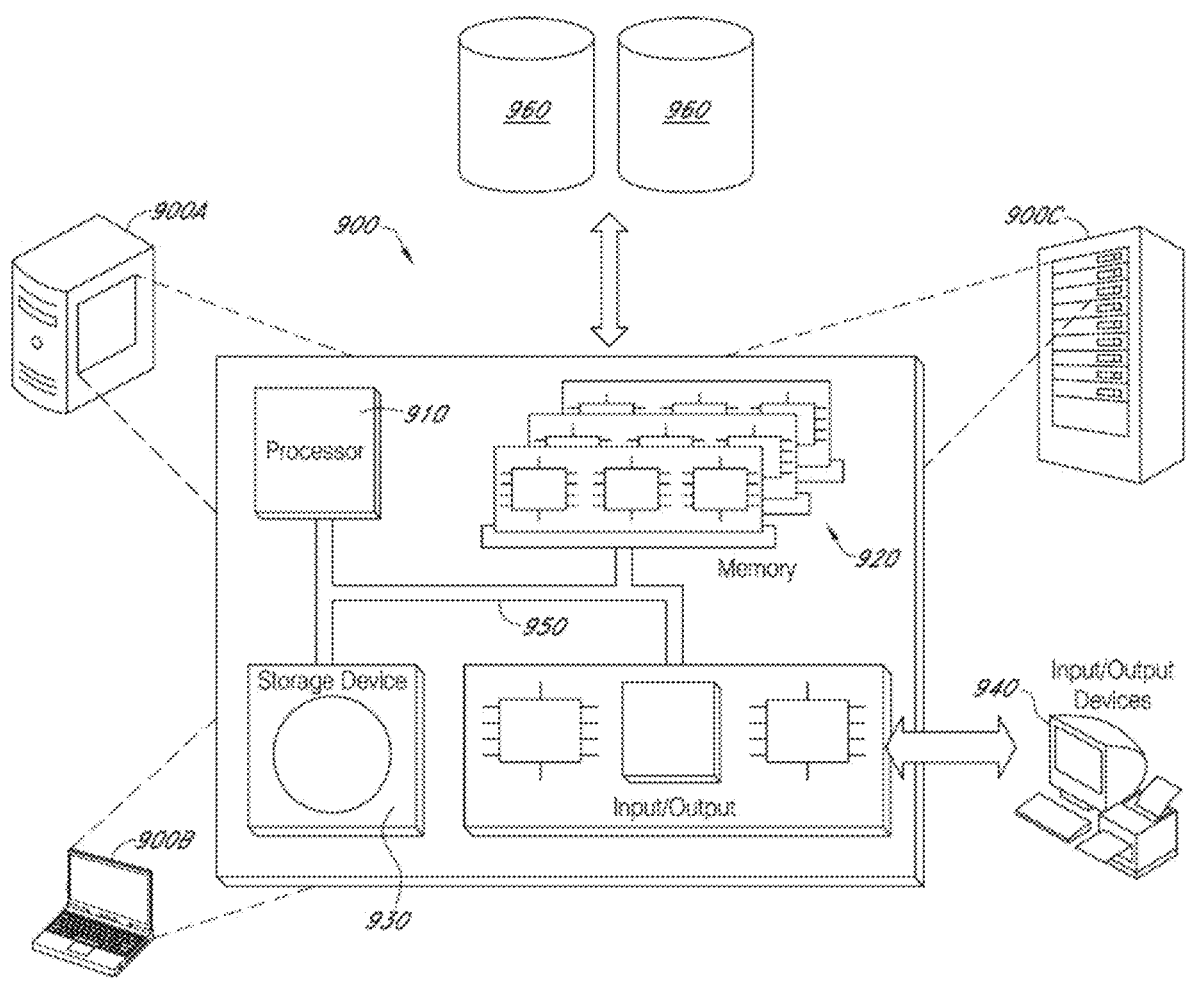
FIG. 26 is a functional block diagram of a system on which the present embodiments may be implemented according to various aspects of present disclosure.

FIG. 26 is a functional block diagram of a system 900 on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. the computer system 900 may include at least one processor 910, a memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more of the I/O devices 940.

The memory 920 may store information, and may be a computer-readable medium, such as volatile or non-volatile memory. The storage device(s) 930 may provide storage for the computer system 900, and may be a computer-readable medium. In various embodiments, the storage device(s) 930 may be one or more of a flash memory device, a hard disk device, an optical disk device, a tape device, or any other type of storage device.

The I/O devices 940 may provide input/output operations for the computer system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An audio/video recording and communication device (A/V device), comprising:
 a housing including a support structure and a removable faceplate;

a processor within the housing;
an image sensor communicatively coupled with the processor and positioned by the support structure;
at least one speaker positioned by the support structure;
a switch positioned by the support structure and responsive to input to activate a doorbell; and
a removable battery:
sized and shaped to fit within a cavity formed by the support structure,
having a release button that physically couples with a detent of the support structure to retain the battery within the cavity when the removable faceplate is removed from the A/V device while the support structure is mounted at a surface, the release button being covered by the removable faceplate when both the removable battery and the removable faceplate are coupled with the A/V device, and
being removable while the support structure is mounted at a mounting surface and the removable faceplate is removed from the housing.

2. The A/V device of claim 1, the release button comprising a leaf spring to maintain engagement of the release button with the detent.

3. The A/V device of claim 1, further comprising:
a flexible translucent membrane secured within an aperture of the removable faceplate and supporting a button aligned with the switch when the removable faceplate is attached to the A/V device; and
a plurality of light emitting elements positioned around the switch by the support structure and operable to transmit light through the flexible translucent membrane.

4. The A/V device of claim 3, further comprising a flex circuit electrically coupling the processor to (a) the switch, (b) the at least one speaker, and (c) the plurality of light emitting elements.

5. The A/V device of claim 1, the removable faceplate having a speaker grill aligned with the speaker when the removable faceplate is coupled to the A/V device.

6. The A/V device of claim 1, further comprising a motion sensor communicatively coupled with the processor.

7. The A/V device of claim 1, further comprising a flexible switch cover coupled with the support structure and covering the switch when the removable faceplate is removed from the A/V device.

8. The A/V device of claim 1, the removable faceplate covering the removable battery when the removable faceplate is coupled to the housing and the removable battery is installed in the cavity.

9. An audio/video recording and communication device (A/V device), comprising:
a processor;
a support structure;
an image sensor communicatively coupled with the processor and positioned by the support structure;
a switch positioned by the support structure and responsive to input to activate a doorbell;
a plurality of light emitting elements positioned by the support structure and around the switch and operable to transmit light through a flexible translucent membrane; and
a removable faceplate having the flexible translucent membrane attached to the removable faceplate within an aperture formed by the removable faceplate, the flexible membrane movably holding a button aligned with the switch when the removable faceplate is attached to the A/V device.

10. The A/V device of claim 9, further comprising a flex circuit electrically coupling the processor to (a) the switch, and (b) the plurality of light emitting elements.

11. The A/V device of claim 9, the removable faceplate having a speaker grill located in alignment with a speaker when the removable faceplate is coupled to the A/V device, the speaker being positioned by the support structure.

12. The A/V device of claim 9, further comprising a flexible switch cover coupled with the support structure and covering the switch when the removable faceplate is removed from the A/V device.

13. The A/V device of claim 9, further comprising an optically transparent lens mounted on the support structure in alignment with the image sensor.

14. An audio/video recording and communication device (A/V device), comprising:
a processor;
a support structure;
an image sensor communicatively coupled with the processor and positioned by the support structure;
at least one speaker positioned by the support structure;
a switch positioned by the support structure and responsive to input to activate a doorbell;
a removable faceplate having a speaker grill aligned with the speaker when the removable faceplate is coupled to the A/V device; and
the removable faceplate including a flexible membrane attached to the removable faceplate within an aperture formed by the removable faceplate, the flexible membrane movably holding a button aligned with the switch when the removable faceplate is attached to the A/V device.

15. The A/V device of claim 14, further comprising a removable battery sized and shaped to fit within a cavity defined by the support structure.

16. The A/V device of claim 15, the removable battery being accessible upon removal of the removable faceplate from the A/V device when the A/V device is mounted at a mounting surface.

17. The A/V device of claim 14, further comprising a flex circuit electrically coupling the processor to (a) the switch, (b) the at least one speaker, and (c) the image sensor.

18. The A/V device of claim 14, further comprising a flexible switch cover coupled with the support structure and covering the switch when the removable faceplate is removed from the A/V device.

19. The A/V device of claim 14, further comprising a flexible translucent membrane attached to the removable faceplate within an aperture formed by the removable faceplate and supporting a button aligned with the switch when the removable faceplate is attached to the A/V device.

* * * * *